United States Patent [19]

Huguenin et al.

[11] Patent Number: 5,227,800
[45] Date of Patent: * Jul. 13, 1993

[54] CONTRABAND DETECTION SYSTEM

[75] Inventors: G. Richard Huguenin, South Deerfield; Paul F. Goldsmith, Leverett; Naresh C. Deo, Conway; David K. Walker, Colrain, all of Mass.

[73] Assignee: Millitech Corporation, South Deerfield, Mass.

[*] Notice: The portion of the term of this patent subsequent to Dec. 17, 2008 has been disclaimed.

[21] Appl. No.: 764,656

[22] Filed: Sep. 24, 1991

Related U.S. Application Data

[63] Continuation of Ser. No. 286,210, Dec. 19, 1988, Pat. No. 5,073,782, which is a continuation-in-part of Ser. No. 183,215, Apr. 19, 1988, Pat. No. 4,901,084.

[51] Int. Cl.⁵ .............. G01S 13/89; H01L 27/146
[52] U.S. Cl. .................. 342/179; 342/351; 250/332
[58] Field of Search ............................ 342/179

[56] References Cited

U.S. PATENT DOCUMENTS

| | | | |
|---|---|---|---|
| 3,403,399 | 9/1968 | Jacobs et al. | 342/179 |
| 3,713,156 | 1/1973 | Pothier | 342/179 |
| 3,746,454 | 7/1973 | Pace et al. | 250/332 X |
| 3,772,689 | 11/1973 | Root, Jr. | 342/188 |
| 3,824,593 | 7/1974 | Baird | 342/179 |
| 3,840,877 | 11/1974 | Crane | |
| 3,909,827 | 9/1975 | Tricoles et al. | 342/179 |
| 3,971,025 | 6/1976 | Levine | |
| 3,986,153 | 10/1976 | Kuno et al. | |
| 4,023,173 | 5/1977 | Hidaka | |
| 4,086,511 | 4/1978 | Redman | |
| 4,106,014 | 8/1978 | Dunn | 342/188 |
| 4,164,740 | 8/1979 | Constant | 342/179 X |
| 4,232,401 | 1/1981 | Chang et al. | |
| 4,317,119 | 3/1982 | Alvarez | |
| 4,385,354 | 5/1983 | Hornfield | |
| 4,509,209 | 4/1985 | Itoh et al. | |
| 4,521,861 | 6/1985 | Logan et al. | 392/351 X |
| 4,611,912 | 9/1986 | Falk et al. | 356/5 |
| 4,754,277 | 6/1988 | Voyce | 342/83 |

FOREIGN PATENT DOCUMENTS 3813858 12/1988 Fed. Rep. of Germany .

OTHER PUBLICATIONS

Reber et al., "Evaluation of Active and Passive Near-Millimeter-Wave Radiometric Imaging Techniues for Detection of Concealed Objects", Sandia Nat. Lab. Reports, SAND 81-1051, Jul. 1981.
Reber et al., "Final Report, Evaluation of Active on Passive Near-Millimeter-Wave Radiometric Imaging Techniques for Detection of Concealed Objects", Aerospace Corporation, Report ATR-80 (7843)-2, Mar. 20, 1981.
Yngvesson et al., "Millimeter Wave Imaging System with an Endfire Receptor Array", 10th Int'l Conf. on Infrared and Millimeter Waves, 1985, Orlando, Fla.

(List continued on next page.)

Primary Examiner—Gilberto Barrón, Jr.
Attorney, Agent, or Firm—Pennie & Edmonds

[57] ABSTRACT

A contraband detection system especially suited for detecting concealed non-metallic contraband such as ceramic or plastic weapons or illegal drugs carried by a person is disclosed. Plural sources of quasi-coherent millimeter wave radiation are disposed so as to uniformly illuminate a field of view. In the preferred embodiment, the radiation emitted by the sources is linearly polarized in a single plane such that the polarization of the radiation with respect to the plane in which linearly polarized radiation is preferentially received by the detectors can be controlled. For detection of dielectric objects, such as ceramic weapons or narcotics, these planes of polarization should be orthogonal to one another. The detector is a staring array which does not require scanning to generate an image of the entire field of view; the signal provided by each element of the detector array corresponds to the illumination reflected from objects in a single portion of the field of view. Real-time imaging of concealed dielectric and metallic objects is thus made possible.

34 Claims, 10 Drawing Sheets

OTHER PUBLICATIONS

Korzeniowski et al., "Imaging System at 94 GHz Using Tapered Slot Antenna Elements", 8th IEEE Int'l Conference on Infrared and millimeter Waves, 1983.

Johansson et al.,. "Millimeter Imaging Systems with an Endfire Receptor Array", 15th European Microwave Conf., 1985.

Yngvesson, "Nea-Millimeter Imaging with Integrated Planar Receptors: General Requirements and Constraints", Infrared and millimeter Waves, vol. 10, Academic Press, 1983.

Schellenbaum, "Far Infrared Contraband Detection System Development for Personnel Search Applications," Sandia Nat. Lab., Report SAND 82-0161, Sep. 1982.

Gagliano et al., "New Weapons Detection Concepts", Final Report on Project A-46666, Feb. 1988, Georgia Institute of Technology.

Yngvesson, "Imaging Front End Systems for MMW and Sub-MMW", SPIE Conf. on Submillimeter Spectroscopy, (1985).

Gillespie and Phillips, "Array Detectors for Millimeter Line Astronomy", Astronomy and Astrophysics, 73, 14-18, (1979).

Neikirk et al., "Imaging Antenna Arrays", Sixth Int'l Conf. on Infrared and Millimeter Waves (1981).

Yen et al., "W-Band, Microstrip Integrated Circuit Transceiver", Microwave Journal, Oct. 1987.

Singh, "W-Band Microstrip Oscillator Using InP Gunn Diode", 1987 IEEE MTT-S Digest, pp. 981, 982.

Rubin, "Varactor—Tuned Millimeter-Wave MIC Oscillator", IEEE Trans. on Microwave Theory and Techniques, Nov. 1976, 866-867.

Singh et al., "Integrated 94 GHz Transceiver with InP Gunn Diode Local Oscillator", Government Microelectronics and Circuits Conference, (1986), pp. 295-295.

Goldsmith et al., "Gaussian Optics Lens Antennas", Microwave Journal, Jul. 1984.

Goldsmith, "Designing Quasioptical Systems", in Microwave System Designers Handbook, Fifth Edition, (1987).

Gibson, "The Vivaldi Aerial", Proc. of the European Microwave Conf., Brighton, UK (1979), pp. 101-105.

Skolnik, Introduction to Radar Systems, pp. 81-84, 228-342, 560-566 (1980).

Fisher, "Beam-Power Plane", Popular Science, (Jan. 1988), pp. 62-65, 106-107.

Brown, "Design Definition of a Microwave Power Reception and Conversion System for Use on a High Altitude Powered Platform", NTIS Report N81-27401, (1981).

T. S. Hartwick, D. T. Hodges, D. H. Barker, and F. B. Foote, "Far Infrared Imagery", Applied Optics, 15, 1919 (1976).

D. T. Hodges and E. Reber, "Evaluation of Passive Far Infrared Radiometric Techniques for Detection of Concealed Objects", Aerospace Report ATR-79 (7745)-1, Mar. 23, 1979.

D. T. Hodges, F. B. Foote, and R. D. Reel, "Final Report, Feasibility of FIR Detection of Selected Materials", Aerospace Report No. ATR-77 (7675)-1, Sep. 10, 1977.

Stepen et al., "A Quasi-Optical Polarization-Duplexed Balanced Mixer for Millimeter-Wave Applications", IEEE Trans. on Mic Theory and Techniques, vol. MTT-31, No. 2, (Feb. 1983), pp. 164-170.

Dixon et al., "Millimeter-Wave InP Image Line Self Mixing Gunn Oscillator", IEEE Trans. on Microwave Theory and Techniques, vol. MTT-29, pp. 958-961, (1981).

J. F. Johansson, "Millimeter Wave Imaging—Theory and Experiments", Research Report No. 151, Chalmers University, May 1986.

K. S. Yngvesson et al., "Endfire Tapered Slot Antennas on Dielectric Substrates", IEEE Transactions on Antennas and Propagation, vol. Ap-33, No. 12, Dec. 1985, pp. 1392-1400.

K. S. Yngvesson et al., "A New Integrated Slot Element Feed Array for Multi-Beam Systems", IEEE Transactions on Antennas and Propogation, vol. AP-34, No. 11, Nov. 1986, pp. 1372-1376.

A. Skalare et al., "Integrated Slot Line Antenna with SIS Mixer for Focal Plane Array Applications," Proc. 17th European Microwave Conference, Rome Italy, Sep. 1987, pp. 1-5.

J. F. Johansson, "A Moment Method Analysis of Linearly Tapered Slot Antennas", Research Report No. 160, Chalmers University, Aug. 1988.

J. F. Johansson, "Theoretical Limits for Aperture Efficiency in Multi-Beam Antenna Systems", Research Report No. 161, Chalmers University, Aug. 1988.

K. S. Yngvesson, et al., "Realizable Feed-Element Patterns and Optimum Aperture Efficiency in Multi-Beam Antenna Systems", IEEE Transactions of Antennas and Propagation, Nov. 1988.

Yngvesson et al, "Millimeter Imaging System with an Endfire Receptor Array" 15th European Microwave Conf. (1985).

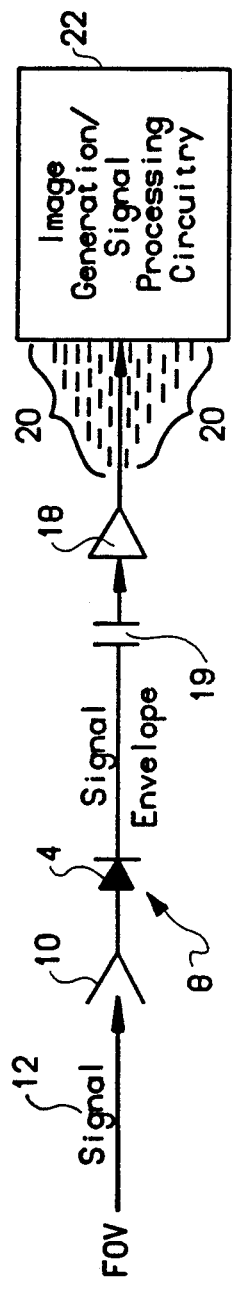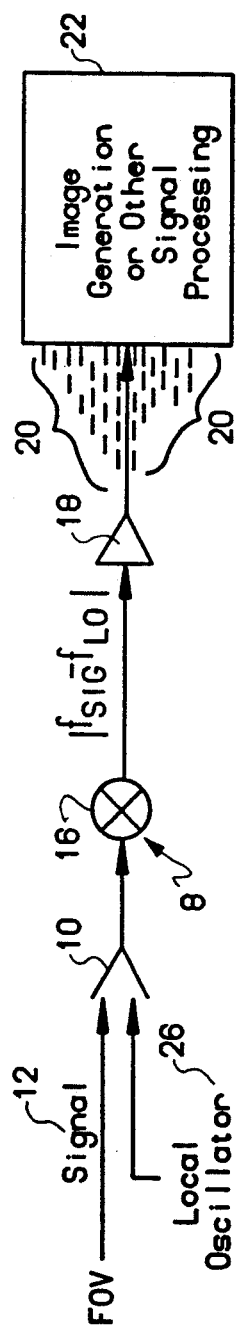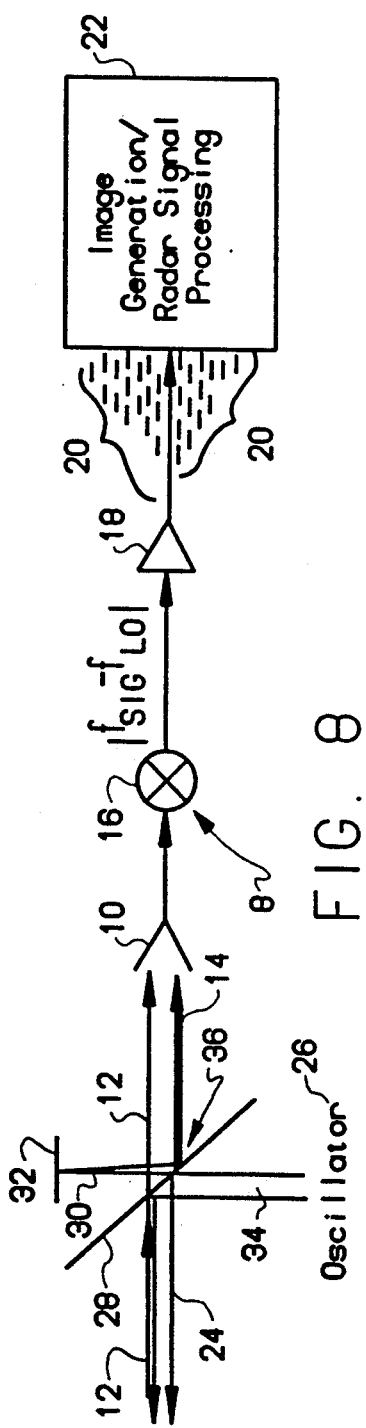

CONTRABAND DETECTION SYSTEM

This is a continuation of application Ser. No. 07/286/210, filed Dec. 19, 1988, now U.S. Pat. No. 5,073,782, which is a continuation-in-part of application Ser. No. 07/183,215 now U.S. Pat. No. 4,901,084 issued Feb. 13, 1990.

FIELD OF THE INVENTION

This invention relates to a system for detecting weapons and contraband carried by persons, particularly weapons and contraband that cannot be readily detected using conventional electromagnetic inspection techniques. The system of the invention is sufficiently sensitive, accurate and rapid that is does not require lengthy inspection of persons passing into a secured area.

BACKGROUND OF THE INVENTION

Present day personnel inspection systems designed to locate weapons which are employed at the portals of secured areas, e.g. courthouses, military installations and the like, normally rely upon electromagnetic detection of a mass of metallic material. Such systems have been in use in airports for a number of years. However, the limitations of such systems are becoming increasingly significant. Electromagnetic systems are limited to the detection of metallic items such as conventional handguns and therefore cannot detect the plastic and ceramic weapons now being manufactured and sold. Such electromagnetic systems also cannot form an image of the detected material; they merely respond to a mass of the metal passing the detector. Similarly, such systems are incapable of detecting other contraband, such as drugs or certain chemical explosives.

The prior art includes a number of proposed systems for detection of non-metallic weapons and other contraband. Many of these have relied upon the ability of millimeter waves (radiation of wavelength between one millimeter and one centimeter, that is, between 30–300 GHz frequency) to penetrate clothing without harm to the wearer. Millimeter waves are generally reflected from metallic objects and can be used to form an image of such objects. The attenuation and reflection characteristics of ceramic and plastic weapons, as well as contraband such as narcotics, are different with respect to millimeter-wave radiation from those of skin, so that it is possible, although it has not previously been practical, to form an image of objects of these materials carried by a person. These characteristics render millimeter waves suitable for detection of ceramic weapons or other contraband concealed beneath the clothing, for example, of an individual seeking to enter a secured area.

However, proposed prior art millimeter wave contraband detection techniques have not been implemented in practical systems. Prior art systems, as exemplified in a number of documents discussed hereinafter, have in general involved a single millimeter wave detector, which is mechanically scanned over a field of view within which the individual is constrained to stand. The reflected signal can be processed and used to generate a television display. The systems of the prior art have at best required about 30 seconds to generate a suitable image. Clearly this is unsatisfactory for use in airports and other crowded areas where many individuals must be permitted to enter the secured area rapidly. Further, any image which requires a 30 second exposure is highly likely to suffer from blurring as the subject moves. Therefore, such systems have found little use.

Another defect of the systems proposed in the prior art involves the lack of contrast between non-metallic contraband articles and the skin of the subjects, particularly as compared to the high reflectivity of specular objects, e.g. belt buckles, eyeglasses, coins, watches and the like.

References generally showing proposed contraband detection systems as described above include the following:

T. S. Hartwick, D. T. Hodges, D. H. Barker, and F. B. Foote, "Far Infrared Imagery", *Applied Optics* 15, 1919, (1976) discusses far infrared (FIR) (i e. 50–1000 um, or 0.05–1 mm) imaging using an FIR laser source and a helium cooled GaAs detector. Both transmissive and reflective arrangements are described. An image is provided by physically moving the object to be imaged to be scanned with respect to the detection system. While it is suggested that such a system could be used for inspection of persons, it would obviously be impractical for airport scanning and comparable security applications, as it would take on the order of minutes to scan each passenger.

D. T. Hodges and E. Reber, "Evaluation of Passive Far Infrared Radiometric Techniques for Detection of Concealed Objects", Aerospace Report ATR-79 (7745)-1 (23 March 1979) discusses FIR (300–3000 um, or 0.3–3 mm) imaging of radiation for detection of nuclear materials and weapons. A radiometric technique is proposed, in which the temperature of objects in the field of view is measured. The difference between body temperature and ambient temperature is used to locate objects carried by individuals. Detection can be accomplished using either "coherent (heterodyne) or incoherent (video) techniques." The coherent approach was chosen, using a Schottky barrier diode mixer and a klystron local oscillator. Again, a single-element detector was used to scan the subject, so that lengthy periods of time were required to form each image.

It is suggested on page 8 of this paper that while a passive system (in which only the radiation emitted by the subject is measured) is preferable, reasonable rates of imaging might require illumination for improved contrast by incoherent sources such as mercury arc lamps with filters to remove the ultraviolet, visible and infrared emissions. It was also noted that some explosive materials were not readily distinguishable from the skin of the subject.

D. T. Hodges, F. B. Foote, and R. D. Reel, "Feasibility of FIR Detection of Selected Materials", Aerospace Report ATR-77 (7675)-1 (30 Sep. 1977) simply reports on tests suggesting that common clothing materials are substantially transparent to FIR radiation. A FIR laser and pyroelectric detector were used in these experiments.

E. Reber, F. B. Foote, R. L. Schellenbaum, and R. G. Bradley, "Evaluation of Active and Passive Near MillimeterWave Radiometric Imaging Techniques for Detection of Concealed Objects", Sandia National Laboratories Report SAND 81-1051 (July 1981) discusses an FIR or near millimeter wave (NMMW) (300–3000 um, or 0.3–3 mm) imaging system. A two-dimensional mechanical scanning system was used in conjunction with an NMMW radiometer to generate a video signal which drove a TV monitor. Active illumination was provided by a klystron. Incoherent illumination was also proposed, using a blackbody radiating at 77K. The heterodyne detection approach was employed, using a Schottky diode mixer and another klystron as a local oscillator source.

This reference discusses on page 15 that if a point source of illumination is used, large flat objects can fail to be detected if they reflect the illumination energy away from the detector, and states that a practical system will require a suitable illumination source. It is stated that ideally the entire hemisphere in front of the person being imaged would be illuminated. It was concluded that coherent illumination, as supplied by a klystron, was unsatisfactory. See page 19.

The time required for this system to form an image was approximately 2 minutes; this is obviously impractical for an airport personnel inspection system, for example. It was suggested that while this might readily be reduced to 1 minute, further improvements would require development of a detector array not then available. Image processing was also proposed.

The disclosure of E. E. Reber and F. B. Foote, "Evaluation of Active and Passive Near-Millimeter-Wave Radiometric Imaging Techniques for Detection of Concealed Objects", Aerospace Corporation Report ATR-80 (7843)-2, (20 Mar. 1981) is essentially identical.

R. L. Schellenbaum, "Far Infrared Contraband Detection System Development for Personnel Search Applications", Sandia Report SAND82-0161 (September 1982) follows the work discussed immediately above and investigated better illumination. A microwave Michelson interferometer was used as the experimental apparatus. A hybrid tee divided the radiation from a Gunn diode source between the field of view and a reference arm. The interrogation signal was mechanically scanned over the target. Hence, lengthy periods would again be required to generate an image. The target reflected the signal back to the detector via the hybrid tee. A variable short and attenuator in the reference arm controlled the phase and amplitude of a reference signal received by the Schottky diode detector. This interferometric technique involved some unavoidable sensitivity to source-to-object distance, which was undesirable. See pp. 9-12.

A number of alternative illumination schemes were also suggested (see page 11). Among others, a large number of point sources was considered, but deemed impractical. Incoherent illumination provided by mercury lamps was considered inadequate. A system involving two collimated Gunn diode oscillators and two dispersing elements reflecting the energy onto an inner diffusing surface of a spherical chamber was suggested. This reference also discusses use of wire-grid polarizers to distinguish retroreflected target signal return (i.e. specular reflection from smooth metallic surfaces) from directly reflected body background (diffuse reflection from skin), concluding that the use of polarizers would not be fruitful See page 39.

J. A. Gagliano, J. M. Cotton, D. M. Guillory, R. H. Platt, and A. T. Howard, "New Weapons Detection Concepts", Final Report on Project A-4666, Georgia Institute of Technology (February 1988) discloses detection of nonmetallic weapons. Acoustic, infrared and millimeter wave systems were tested; only the last was found to be feasible. A millimeter wave (3 mm) imaging system comprising a single mechanical scanner was used for evaluation of passive and active systems. This again would involve lengthy image generation delays. The passive system could not be made to work with the instrumentation available. The active system (i.e. one using illumination sources) comprised an IMPATT oscillator the output of which was frequency modulated and divided in a hybrid tee, which introduced 180° phase difference of the signal between the two transmission ports. It was determined that the active system was unworkable even after the "illumination coherency was further disrupted by sending it from two points with spatially different polarizations" See page 75.

Possible improvements on the active system are discussed at pages 77-78. Development of a single incoherent "noise source" as illuminator is discussed and the suggestion is made that its output energy should be divided and transmitted from several locations, with differing delays, to destroy the effects of "quasi-coherence."

As noted, the Reber et al references suggest that, in principle, array detectors could eliminate scanning and reduce the time required for image formation, but mention that suitable arrays capable of doing so did not exist. Other documents suggest use of multiple element arrays for imaging millimeter wave radiation for astronomical imaging purposes, but contain no suggestion that such arrays might be useful for weapons or contraband detection. See Yngvesson, "Near-Millimeter Imaging with Integrated Planar Receptors; General Requirements and Constraints," in *Infrared and Millimeter Waves*, 10, (Academic Press 1983). FIG. 8 of this document shows a Vivaldi receptor array. Further details of this detector system are shown in Yngvesson et al. "Millimeter Wave Imaging System with an Endfire Receptor Array", *10th Int'l Conf. on Infrared and Millimeter Waves* (1985). Diode detectors extending across pairs of antenna elements making up the detectors of the array are shown in FIG. 7. Similar disclosures are found in Johansson et al, "Millimeter Imaging System with an Endfire Receptor Array", *Proc. 15th Europ. Microwave Conf.* (1985), in Korzeniowsky et al, "Imaging System at 94 GHz using Tapered Slot Antenna Elements," *Eighth IEEE Int'l Conf. on Infrared and Millimeter Waves* (1983), and in Yngvesson, "Imaging Front-End Systems for Millimeter Waves and Submillimeter Waves," *SPIE Conf. on Submillimeter Spectroscopy* (1985). The method of injecting the local oscillator signal for heterodyning with the received signal shown in these references, involving injection of the signal into an aperture in a reflector in a Cassegrain-telescope optical system, is very awkward, and the device would not be well suited to contraband detection.

In Stephan et al, "A Quasi-Optical PolarizationDuplexed Balanced Mixer for Millimeter-Wave Applications," *IEEE Trans. on Microwave Theory and Techniques*, vol. MTT-31, No. 2 (1983) pp. 164-170, a mixer is described in which a local oscillator signal is quasi-optically injected from one side of a substrate and mixed in a balanced mixer with the received signal coupled from the other side. The RF signal and local oscillator (LO) signal can be of orthogonal polarizations. It is suggested that the LO signal could arrive from either side of the substrate, although no implementation of the "same-side" arrangement is provided. The suggestion is made that arrays of such devices could "open the way to phase-coherent imaging of millimeter-wave fields at a focal plane." See page 170. However, neither side of the substrate of this device in the embodiment disclosed would be available for other circuitry, as is highly desirable. There is no teaching in Stephan et al of a practical contraband detection device.

SUMMARY OF THE INVENTION

According to the present invention, a "staring" millimeter wave sensor comprising an array of detectors is employed to detect contraband. The staring sensor is directed at the field of view, so that each of the elements of the sensor provides a continuous signal responsive to radiation detected from a corresponding portion of the field of view. The output signals can be used to drive a video display unit or the like wherein each picture element (pixel) of the image corresponds directly to the corresponding portion of the field of view. In this way, scanning of the field of view by the sensor can be eliminated, permitting the image to be generated essentially in real time.

According to another aspect of the invention, arrays of sources of millimeter wave radiation are disposed to uniformly illuminate the field of view, for example on either side of the sensor array. The arrays consist of a number of oscillators which are not all constrained to operate at the same frequency. Normal variations in the manufacture of the oscillators provide enough variation in their physical characteristics that they do not resonate at the same frequency, thus providing substantially incoherent illumination from a number of sources, each of which itself emits coherent radiation. It has been discovered that radiation of this degree of incoherency, provided from spatially diverse sources which distribute the illumination over the field of view, mitigates both "glint" and "speckle" effects in the image. "Glint" results from specular reflection of coherent or incoherent point-source radiation, e.g. the sun shining on automobile windshield, while "speckle" is an interference effect common to reflection of coherent radiation, e.g. visible laser light reflecting from a wall. According to this aspect of the invention these two common problems are avoided.

In accordance with another aspect of the invention, the radiation emitted by the oscillators is preferably polarized. In most cases, linearly polarized illumination radiation is preferred, and a detector is used which is preferentially sensitive to radiation linearly polarized in a particular plane. The polarization of the radiation and the sensitivity of the detector are then controlled in accordance with the particular contraband to be detected in order to minimize noise in the reflected signal by reducing signal return from metallic items, skin, clothing or other superfluous objects, referred to herein as "clutter" Elliptically or circularly polarized radiation can also be employed and the detection apparatus adjusted to yield the best image of the particular contraband to be detected.

Where the contraband is non-metallic, e.g., ceramic weapons, narcotics, plastic explosives or the like, it is found in accordance with the invention that the best image can generally be obtained by making the detector array preferentially selective to radiation polarized orthogonal to the polarization of the illumination radiation. This is referred to herein as the "orthogonal" arrangement. When the incident and preferentially detected radiation are thus orthogonal to one another, detection of retroreflected radiation from metallic objects in the field of view is greatly reduced, as is radiation directly reflected from clutter. However, ceramic and plastic objects, particularly of complex shapes, and granular materials such as quantities of narcotics, reflect incident polarized radiation in this spectral region in essentially random fashion, such that some radiation becomes polarized in the plane of the detector sensitivity.

As the reflection from clutter is attenuated due to the orthogonal arrangement of the sources and detector, the signal-to-noise ratio of the system with respect to amorphous plastic and ceramic objects and granular materials such as narcotics is much improved. The millimeter wave radiation apparently undergoes multiple internal reflections in plastic or ceramic objects such as weapons, so that the polarization of the radiation is varied somewhat, whereby it can be detected by the detector array.

Metallic objects are still detectable by an observer with the system in this orthogonal arrangement; only specular metallic surfaces do not appear in the image generated by the detector array. For example, the cross-hatched grips conventionally used on pistols, the lines at which the planes of their surfaces meet, curved surfaces, and the like are imaged relatively well. It is also possible to vary the relative polarization of the radiation and the detector sensitivity to generate images of both metallic and nonmetallic objects.

The ability of the staring sensor of the invention to provide individual output signals corresponding to each element of the array allows very simple processing of these signals to form a video signal, and also renders them readily amenable to digital signal processing techniques used to improve the contrast of the signal reflected from the contraband relative to the skin of the individual, to reduce graininess in the images, or to provide other practical image enhancements. These techniques are currently within the skill of the art.

The preferred oscillators comprise Gunn diodes or other solid-state oscillators. However, klystrons and other sources of millimeter-wave radiation at a single frequency (as opposed to black-body radiators emitting energy over a wide spectrum) are also suitable, if somewhat less practical.

Where linearly polarized radiation is used, the Gunn diode oscillators which are preferably employed are formed on substrates which define the plane of polarization of linearly polarized radiation emitted by the sources. The sources are aligned so that all emit radiation polarized in the same plane. The detecting array typically comprises an array of detectors, each comprising a pair of planar antenna elements formed directly on the supporting substrate. These elements are preferentially sensitive to linearly polarized radiation polarized parallel to the plane of the substrate.

BRIEF DESCRIPTION OF THE DRAWINGS

The invention will be better understood with reference to the accompanying drawings, in which:

FIG. 6 shows schematically the signal path provided by a single element of the detector array in a first embodiment of the invention;

FIG. 7 shows schematically the signal path in a single element of the detector array in a superheterodyne embodiment of the invention;

FIG. 8 shows schematically the signal path in a single element of the detector array in an illuminating superheterodyne embodiment of the invention;

FIG. 17, comprising

DESCRIPTION OF THE PREFERRED EMBODIMENTS

Figure 1:
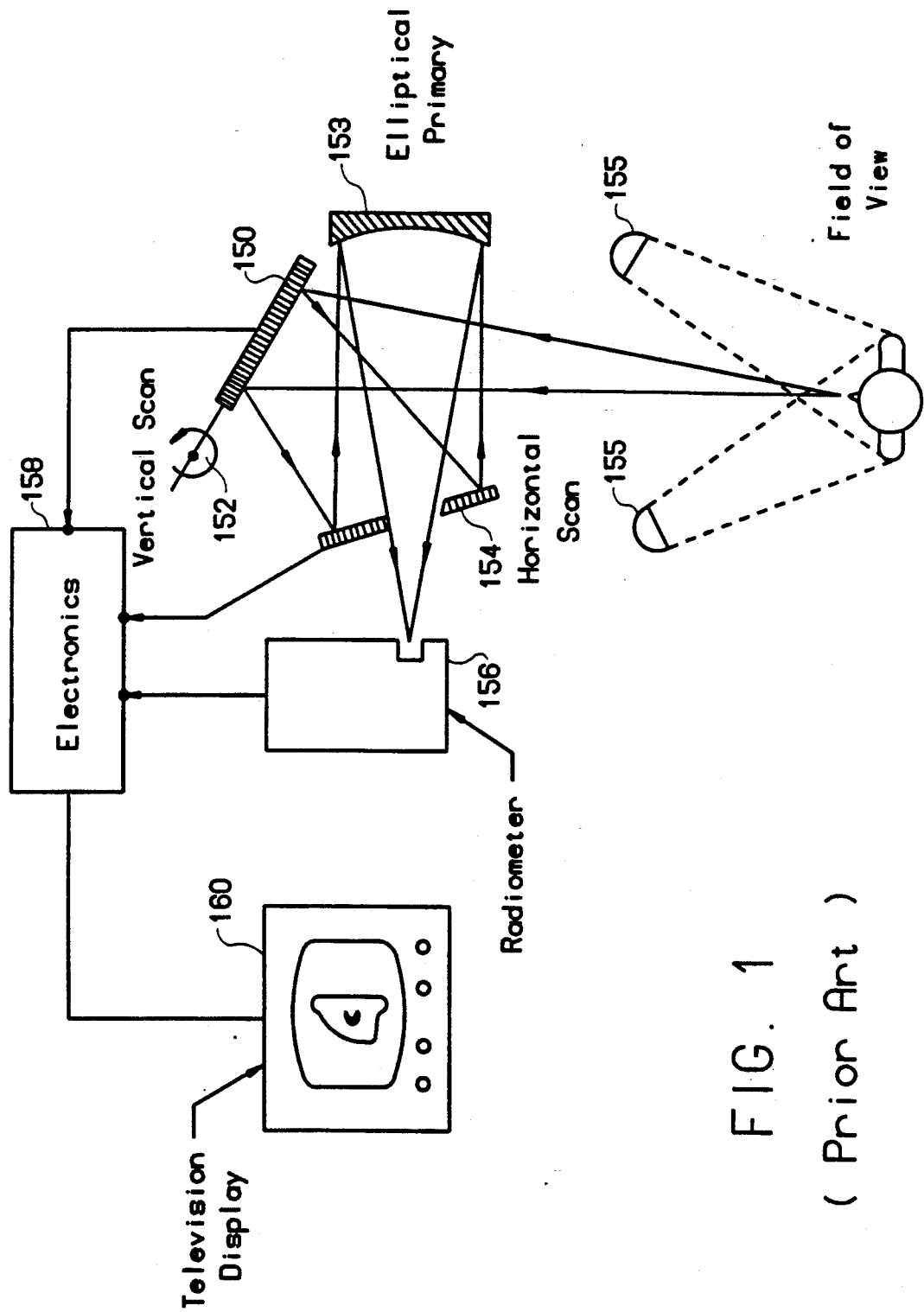
FIG. 1 shows a schematic view of prior art systems which unsuccessfully attempted to detect non-metallic contraband on the persons of individuals.

FIG. 1 shows a prior art device as proposed but not successfully implemented. Radiation from a field of view is effectively scanned by rotation of first mirror 150 about a vertical axis indicated generally at 152, and by scanning of a second mirror 154 about a horizontal axis. Other mechanical scanning techniques are known. Radiation from the field of view is reflected from a primary mirror 153 and detected by a radiometer 156. Processing electronics 158 receive synchronization signals from the vertical and horizontal mirrors and use these to convert the raster-scanned signal from the field of view into a video signal used to drive a display. The art suggests as indicated above that noncoherent sources of illumination, e.g. mercury lamps, could be used to provide illumination, as indicated at 155. As discussed above, a principal defect in this system among others is that typical scanning times amount to thirty seconds or more. This is unacceptable for screening passengers at airports, for example.

Figure 2:
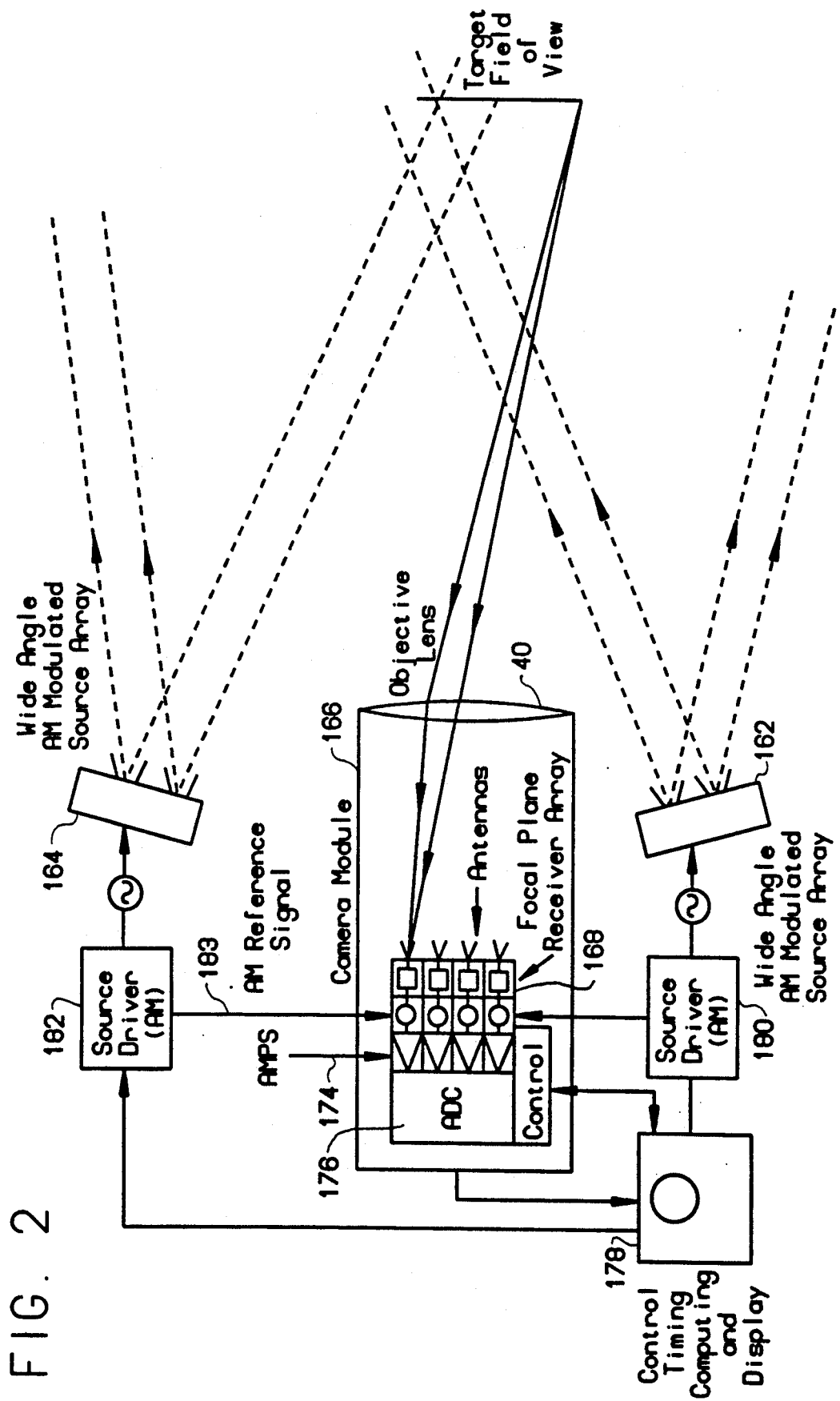
FIG. 2 shows a schematic plan view of the system according to the present invention for detecting contraband.
Figure 3:
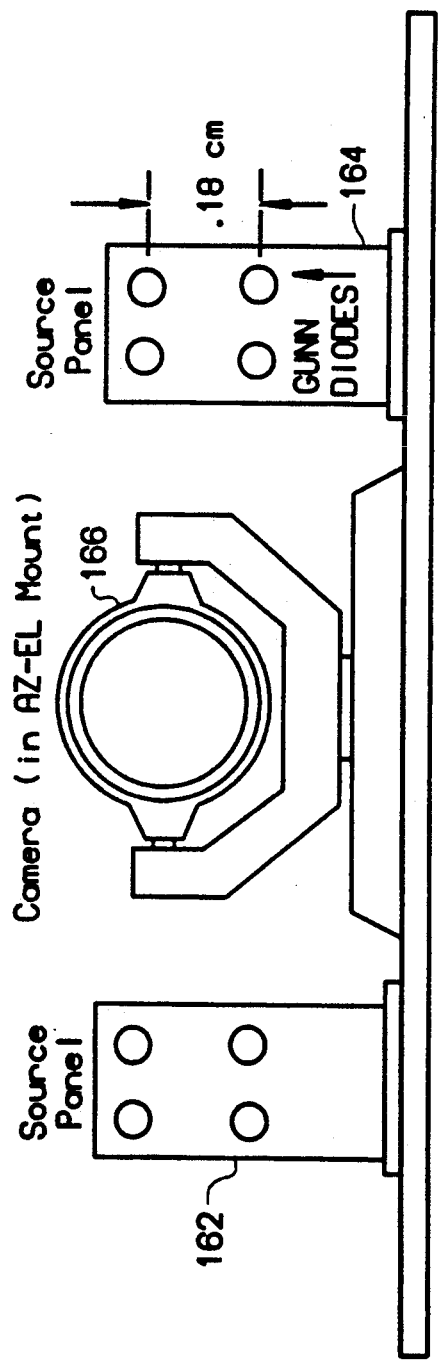
FIG. 3 shows an elevation view of the source and detector elements of a system for detecting contraband according to the invention.

FIG. 2 shows in plan view a system in accordance with the invention. FIG. 3 shows a front elevation of the sources and detector arrays used. In FIG. 2, two source arrays, 162 and 164, are shown disposed to evenly illuminate the field of view; for example, the panels could be disposed on either side of the detector array, depicted as a camera module 166. The arrays consist of at least two point sources of millimeter-wave radiation; larger numbers of sources will provide more even illumination and are preferred. In an airport portal inspection system, arrays 162, 164 might be configured as roughly 3×6 foot panels made up of Gunn diode oscillator assemblies each 9 inches square, which might each include nine oscillators. The panels might also be disposed on opposite sides of a passageway, with the camera module 166 being aligned along the passageway.

According to one aspect of the invention, each of the source arrays emits "quasi-coherent" radiation, meaning that radiation is emitted by a number of oscillators which are not constrained to operate at the same frequency, but among which the resonant frequency distribution need be no greater than inherent in normal manufacturing variation to achieve the desired results. The term "quasi-coherent" as used herein further indicates that the radiation from all sources is of the same polarization. Typically, in the system arrangement shown in FIG. 2, the radiation emitted by the two sources 162, 164 would be linearly polarized in the horizontal plane.

It will be appreciated that linear polarization is but one special case of polarized electromagnetic radiation, which is generically termed elliptically polarized. Circularly polarized radiation is another such special case. For reasons which will appear hereinafter, linearly polarized radiation is emitted by the sources 162 and 164 in the preferred embodiment of the system of the invention. However, it must be understood that many of the advantages provided by the invention would also be realized if circularly or elliptically polarized radiation were employed.

The detector array, shown schematically at 168 and in more detail in connection with FIGS. 4-11, is preferentially sensitive to radiation polarized in a particular manner, which according to an important aspect of the invention is controlled with respect to the polarization of the radiation emitted by the sources. Where a system employing linearly polarized radiation is to be employed to detect dielectric contraband such as ceramic weapons, narcotics, or certain non-metallic explosives, detectors preferentially selective to radiation linearly polarized in a particular plane are used. More specifically, applicants find that the plane of the polarization of the radiation to which the detectors are preferentially sensitive should be orthogonal to the plane of polarization of the illuminating radiation.

In order to detect contraband such as conventional metallic weapons, nuclear materials or certain metal-encased explosive materials, better imaging may be achieved by aligning the plane of polarization of the emitted radiation parallel to (rather than orthogonal to) the plane of preferential sensitivity of the detector array. Accordingly, the plane of polarization of the radiation emitted by the sources may be switched relatively rapidly over time to change the sensitivity of the system. This can be accomplished simply by rotating the source array through 90°, by rotating polarizing grids in front of the camera 166 and/or the sources in certain embodiments thereof, or by electronically varying the plane of polarization of the radiation emitted by stationary sources.

The camera 166 includes an objective lens 40 which focuses radiation from the field of view onto a focal plane in which lie the individual elements of the detector array. Each provides an output signal the amplitude of which corresponds to the intensity of the radiation from the corresponding portion of the field of view. Source drivers 180 drive the source arrays. The sources are amplitude modulated by the source drivers 180, e.g. at 1-10 kHz, so that the signal detected by the elements of the receiver array is an ac signal. Otherwise, a dc signal would be detected, which would be more difficult to process.

Preferably, the illuminating radiation is amplitude modulated using a square wave, i.e., an on-off signal. The signal detected by the detectors with the illumination sources off is background, noise, etc., which is consistently detected. Therefore this can be subtracted from the signal detected while the illumination sources are on (i.e., the reflected illumination signal plus the background) to yield the reflected illumination signal only. Such synchronous detection schemes are commonly employed in electronic systems generally to increase the system signal-to-noise ratio.

The detected signals are amplified in amplifiers 174. The amplified signals are provided to analog-to-digital converters which in turn are connected to a control, timing, computing and display unit 178. This unit converts the individual digital signals output by the analog-to-digital unit 176 into a video signal for display. Alternately, the signal provided by the analog-to-digital converter 176 can first be signal processed using any of a wide variety of digital signal processing techniques, for example to increase the contrast within the signal.

FIG. 3 shows as mentioned a front elevation of the source arrays 162, 164 and of the camera 166 of the system shown in FIG. 2. This embodiment of the system of the invention is envisioned for use in airport monitoring, e.g., to control secured areas. In this embodiment of the system it might also be desired to feed a local oscillator signal into each of the elements of the detector array for mixing with the received signal. The local oscillator signal provides a superheterodyne effect; as is well known to those of skill in the art, this substantially increases the signal-to-noise ratio of the system. According to the present invention, the local oscillator signal if used may be combined with the received signal separately in each of the elements of the array using a quasi-optical technique discussed in detail below.

In additional embodiments of the invention it may also be desired to use the same oscillator to provide some or all of the illumination of the field of view as well as the local oscillator signal for demodulation of the received signal. This is useful in forming a small, compact, possibly even hand-held unit for scanning contraband conveniently, in circumstances where setting up a permanent portal detection system would be inappropriate.

As mentioned, one way to provide time variation of the polarization of the illumination radiation with respect to the preferentially detected plane is to alternately transmit the radiation from emitting antennas oriented along orthogonal axes. Duplicate sets of oscillators and orthogonal associated transmitting antennas may be provided on the source panels described above; the modulating signal can then be alternately applied to the oscillators of the orthogonally aligned groups of emitters. The same oscillators may, as an alternative, be alternately connected to orthogonal transmitting antennas. Improvements in PIN diode technology over that available as of the filing of this application are anticipated which would make this embodiment practical.

Figure 4:
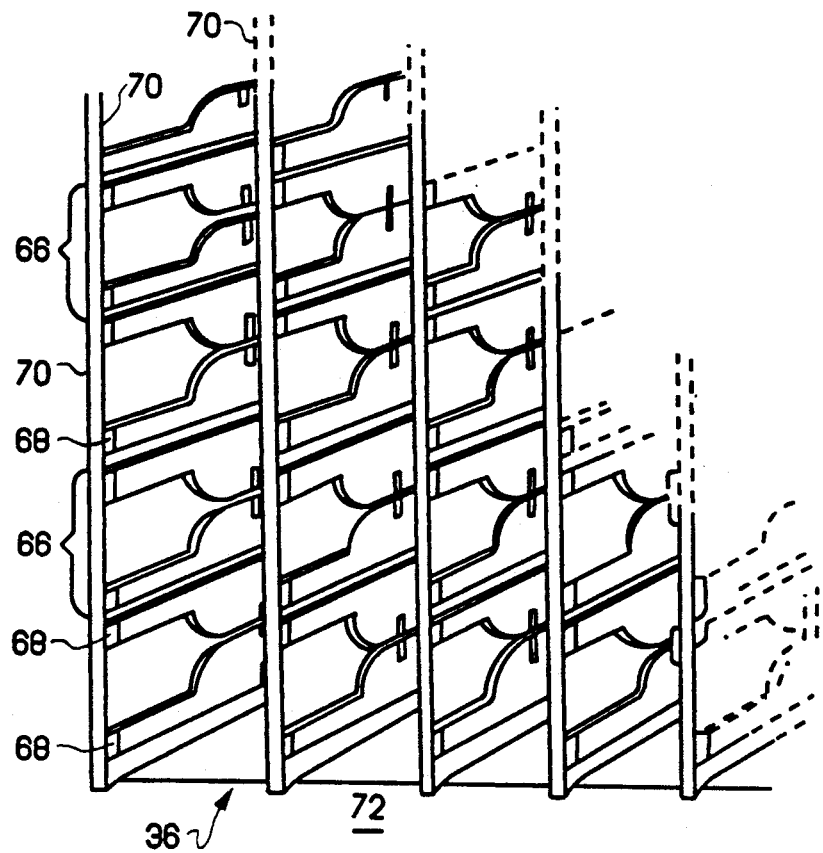
FIG. 4 shows a perspective view of a portion of the detector array of the invention.
Figure 5:
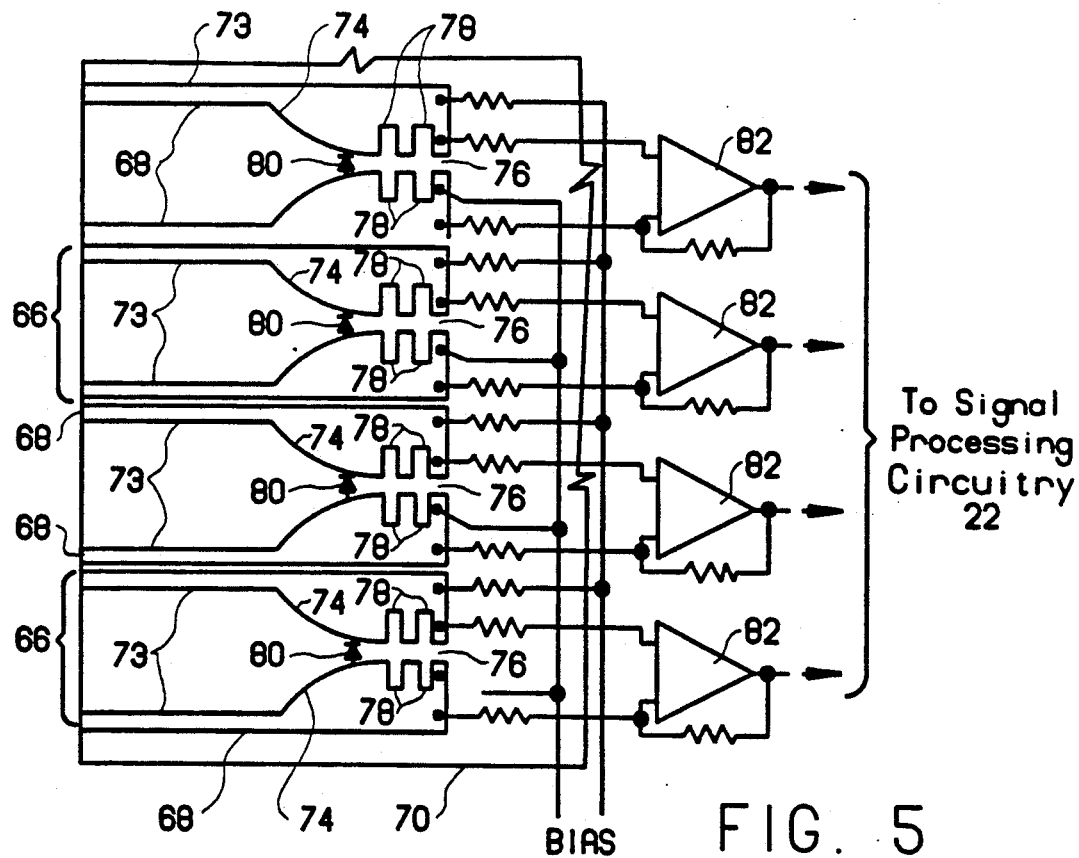
FIG. 5 shows a plan view of a portion of the detector array of the invention.

FIG. 4 shows a perspective view of a portion of the antenna/detector array 36 used in all embodiments of the camera 166 of the invention, while FIG. 5 shows schematically a plan view of a portion of a substrate 70 on which conductors 68 making up the individual elements 66 of the array 36 of antenna/detector elements are formed, and a portion of the associated circuitry. Array 36 comprises a plurality of substantially identical imaging antenna/detector elements 66. Each imaging element 66 comprises a balanced pair antenna which may be formed directly on a dielectric substrate 70 such as Kapton (TM) in turn supported on an alumina panel. These assemblies are spaced from one another by a precision spacer member 72. The outline of the antenna elements 68 in a preferred embodiment is shown in FIG. 5. As indicated, the array elements 66 each comprise two spaced conductors 68 each comprising parallel portions 73 which extend a distance into the array 36 (the incident radiation being received endwise in the view shown in FIG. 4), curved portions 74 which approach one another along a curved outline, and further portions which are separated by a slot 76 and extend for another distance.

Such antenna elements 66 are referred to in the art as "endfire traveling wave slot antennas", as originally described by P. J. Gibson, "The Vivaldi Aerial", *Proc. of the European Mic. Conf.*, Brighton, UK (1979), pp. 101–105. A nonlinear circuit element 80, such as a diode or other square-law detector, is connected across the pair of conductive elements 68 of each antenna 66. In a preferred embodiment of the invention, the imaging array 36 may comprise an array $100 \times 100$ of antenna/detector elements 66, resulting in 10,000 identical antenna/detector elements 66 in the overall array 36. This is adequate to provide quite reasonable resolution, for example, to produce a visible image of the field of view.

The function of the non-linear circuit elements 80 varies somewhat depending on the embodiment of the invention. In the simplest embodiment of the invention (discussed further in connection with FIGS. 6 and 9), the antenna elements 68 simply detect millimeter wave radiation received from the field of view. The diodes 80 connected across the paired antenna elements rectify the input energy, and provide an output signal which follows the envelope of the input millimeter wave energy. For example, suppose that the field of view includes a person carrying a concealed weapon. An image can readily be formed which will clearly locate the relative position of objects in the field of view which reflect or partially attenuate millimeter wave radiation more or less than other portions of the field of view. The weapon will show up as a dark or light area, depending on its relative reflectivity. The bandwidth of the energy detected is simply a function of the design of the imaging elements 66.

In a further embodiment of the invention, discussed in connection with FIGS. 7, 8, and 10–13, the diodes also mix a local oscillator signal with the millimeter wave energy received from the field of view. As is well understood, the mixing process results in sum and difference components. The sum component is typically discarded, and the difference component signal is processed to yield the intensity of the corresponding pixel of the image. Mixing the local oscillator signal with the received energy in each element of the array greatly increases the signal-to-noise ratio of the system. If each imaging element of the sensor array of the invention in its simplest embodiment is analogized to a simple crystal detector radio set, then each imaging element of the sensor array in its embodiment in which a local oscillator signal is mixed with the received signal is comparable to a superheterodyne receiver.

It will be appreciated therefore that the diodes perform the rectifying or envelope detection function where no local oscillator signal is provided or perform the mixing function if the local oscillator signal is provided. Reference in the following to "mixer" diodes should be understood to include diodes solely performing the rectifying or envelope detection function unless the context indicates the contrary.

As indicated, each antenna/detector element 66 comprises a pair of conductors 68, each of which has a relatively thin forward section 73 extending toward the field of view, an exponential middle section 74, and a terminal slot 76 separating the two elements 68. Diodes 80 are connected across the conductors 68, as indicated by FIG. 5. In a preferred embodiment, slot 76 has two additional slots 78 extending from either side thereof and orthogonal thereto. These slots 78 comprise a radio frequency choke which reflects any unrectified millimeter-wave energy as well as the sum of the local oscillator and detected signals formed upon their mixing, while passing the difference signal.

As noted, the actual envelope detection and mixing functions are performed by a nonlinear circuit element, e.g., a diode 80, which is preferably physically disposed between the two conductive elements 68 of each element, that is, directly across the slot 76. In a preferred embodiment discussed in detail below, the diode 80 is formed directly on the substrate 70 without separate connecting leads.

After envelope detection or mixing of the local oscillator signal and the signal from the field of view by diodes 80, and filtering by the RF chokes formed by the slots 78, the signal which remains is a relatively "clean" intermediate frequency signal which can be amplified by conventional operational amplifiers 82 associated with each element 66 of the array 36. The output signals from amplifiers 82 can be supplied directly to the image formation or other radar signal processing circuitry 22 as indicated above.

FIG. 6 shows schematically the arrangement of each of the elements 8 of the array 36 in a first "radiometric" embodiment of the invention, wherein the array simply detects millimeter-wave energy reflected from objects in the field of view (FOV). The signal 12 is detected by an antenna element 10 and rectified by a diode 4. The signal resulting is amplified by an amplifier 18 and is supplied together with a large number of like signals 20 to generally conventional image generation and signal processing circuitry 22. The signal-to-noise ratio of the signal from elements 8 as shown in FIG. 6 may also be increased by connecting a storage element, indicated schematically as a capacitor 19, for storing the energy rectified by the diode 4.

FIG. 7 is a block diagram showing the individual signal processing components employed in each of a large number of mixer/detector elements 8 in a superheterodyne embodiment of the imaging device of the invention. A millimeter-wave oscillator 26 provides a local oscillator signal which is mixed with the reflected radiation 12 to provide a lower frequency signal for convenience in signal processing, and to increase the signal-to-noise ratio with respect to the embodiment of FIG. 6. FIG. 8 is a block diagram of a similar system in which the energy 34 provided by the millimeter wave oscillator, used to provide the local oscillator signal, is also used to illuminate the field of view with millimeter-wave radiation. In both cases an antenna 10 detects radiation reflected from or emitted by objects in the field of view. Energy 12 detected from the field of view at frequency $f_{sig}$ and the local oscillator signal 14 at frequency $f_{LO}$ are combined in a mixer 16. The difference signal, at frequency $|f_{sig}-f_{LO}|$, is supplied to a video or radio frequency amplifier 18. The amplified signal, together with a number of similar signals 20 from other identical elements 8 of the array, is supplied to signal processing circuitry 22 for generation of an image, or other purposes.

Where the field of view is illuminated, the overall system termed is "active"; otherwise, it is "passive". The detector embodiments of FIGS. 6 and 7 can be employed in either active or passive systems. The FIG. 8 embodiment, since the local oscillator then also illuminates the field of view, is always active. In each embodiment of the detector, a large number, e.g., $10^4$, of the mixer/detector elements 8 shown schematically in FIGS. 6, 7 and 8 are arranged in a detector array, as generally shown in FIGS. 4 and 5. The signal output of each element 8 corresponds to a portion of the field of view; if an image is to be formed, each element 8 may be taken to correspond to one or several particular picture elements ("pixels") of the image. In the case of the FIG. 6 embodiment, the signal is simply the "envelope" of the energy emitted by or reflected from objects in the field of view. In the FIGS. 7 and 8 embodiments, the signal output by each element 8 is a signal the frequency of which is responsive to the absolute value of the difference between the frequency of the received signal 12 and the frequency of the local oscillator signal 14. The amplitude of the image signals is approximately proportional to the amplitude of signal 12.

Accordingly, since a multiple element focal-plane array is used, in which each element of the detector array is mapped to a portion of the field of view, a single image-forming element need not be scanned either mechanically or electronically over the field of view, as shown in the proposed contraband detection systems discussed in the literature mentioned above. For example, an ordinary analog video signal can be generated simply by successively interrogating each of the imaging elements 8 along successive rows of the array of elements, as is done in cameras using a CCD imaging device.

It will be appreciated as well that the rectification or envelope detection and mixing functions (where mixing is performed) are provided by nonlinear elements which are integrally combined with each of the antenna elements 10 by which the energy is detected. Accordingly, no waveguide structure or like complication is required to combine the local oscillator signal 14 with the signal 12 received from the field of view. This greatly simplifies construction of the sensor according to the invention.

It is anticipated that contraband detection systems according to the invention which are intended for control of secured areas, e.g. airport departure areas, will employ the FIG. 6 system; in this application, the local oscillator is not anticipated to be required, as the illumination can be made quite powerful simply by multiplying the number of oscillators in the sources, 162, 164. If this is inconvenient, a local oscillator can be used to increase the signal-to-noise ratio, thus employing the FIG. 7 detector. Further, if it is desired to combine the radiation source and detector into a single device, e.g., as a handheld contraband detector for examining baggage or the like, the FIG. 8 detector might be chosen. In this case, however, the reduction of glint and speckle which are obtained by use of spatially distributed sources of quasi-coherent illumination in other embodiments of the invention will not be realized.

FIG. 8 shows an embodiment of the imaging array of the invention in which the energy output by a millimeter wave oscillator 26 is split into unequal parts. The minor portion 30 is used as a local oscillator signal, while the major portion 24 is transmitted as an illumination beam 24 onto the field of view. More particularly, the millimeter-wave energy signal 34 generated by the source 26 is linearly-polarized, such that it can be split into major and minor components 24 and 30 respectively by a polarizing grid 28. The major component 24 is employed as an illumination beam after reflection from the polarizing grid 28. The minor portion 30, which may include approximately 10% of the total signal energy output by the source 26, passes through the polarizing grid 28. It is then reflected from a twist reflector 32, which rotates its polarization through 90°, and back onto the grid 28, which reflects it toward the array of mixer/detector elements 8. The minor portion 30 thus becomes the local oscillator signal 14, which is then combined with the reflected signal 12 from the field of view.

Accordingly, it can be seen that in the FIG. 8 embodiment the energy 34 from oscillator 26 is used both as an illumination beam 24 to illuminate the object and as the local oscillator signal 14 which is mixed with the signal 12 reflected from the field of view 12.

Figure 9:
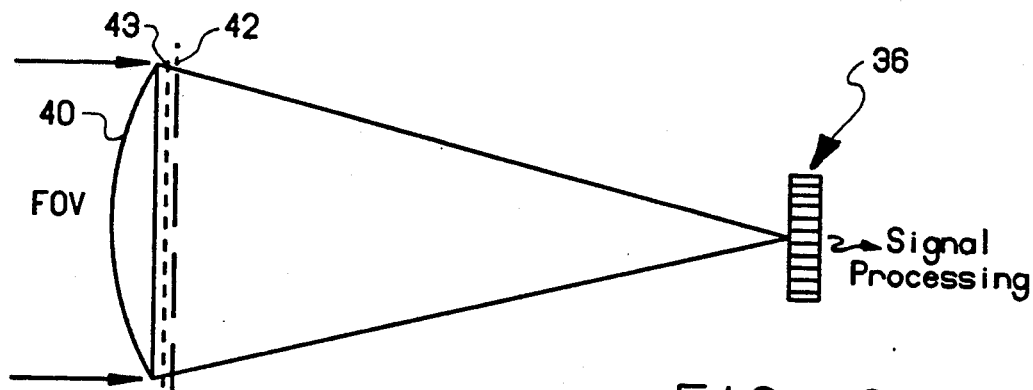
FIG. 9 shows the optical arrangement of an embodiment of the invention corresponding to FIG. 6.

FIG. 9 shows a possible optical arrangement of the millimeter wave detection device corresponding to FIG. 6. A lens 40 (which could be replaced by a focusing mirror) collects millimeter-wave radiation from the field of view. A high pass filter 42 will typically be provided. The detector array 36 described in connection with FIGS. 4 and 5 is in the focal plane of lens 40; as indicated above, each element of array 36 outputs a signal corresponding to millimeter wave energy received from a corresponding portion of the field of view. A true focal plane array imaging system for millimeter wave radiation is thus described. This embodiment of the detector array of the invention is envisioned for use in conjunction with arrays of sources of radiation which in total is quasi-coherent, as described above for contraband detection systems for protecting secured areas, e.g. airport departure areas. An optional polarizing grid 43 may also be provided to further control the polarization of the detected radiation.

Figure 10:
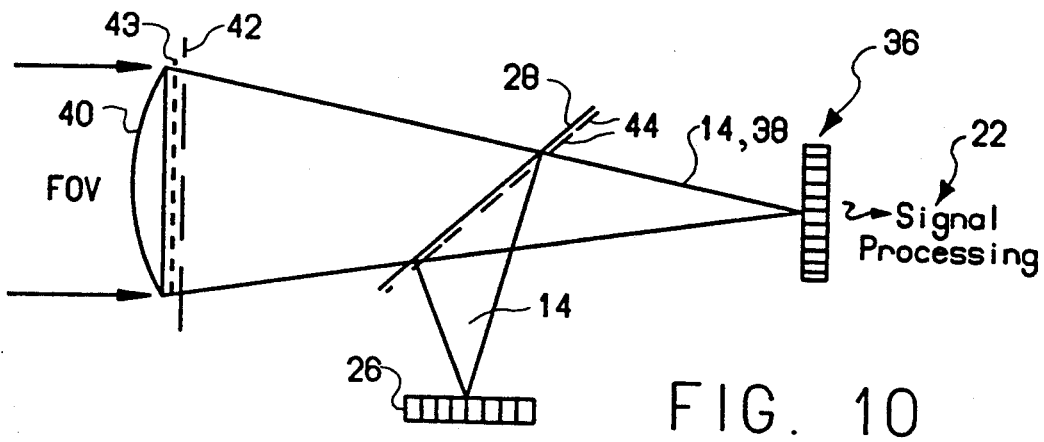
FIG. 10 shows the optical arrangement of the invention in an embodiment corresponding to FIG. 7.

FIG. 10 shows the corresponding view of the system of FIG. 7. In this case a source array 26 emits polarized millimeter wave energy which is incident on a polarizing grid 28 to be described below. This local oscillator signal is combined in array 36 with energy received from the field of view, generally as described above. FIG. 10 thus shows the optical arrangement of the superheterodyne detection system of the invention. Again a high pass filter 42 and a polarizing grid 43 may be used to further reduce noise in the detected signal.

Figure 11:
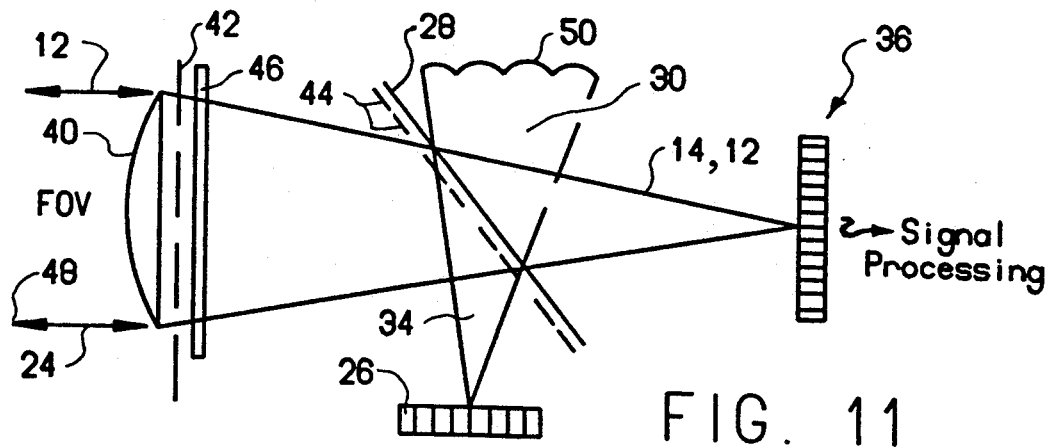
FIG. 11 shows an optical arrangement of the invention in an embodiment corresponding to FIG. 8.
Figure 12:
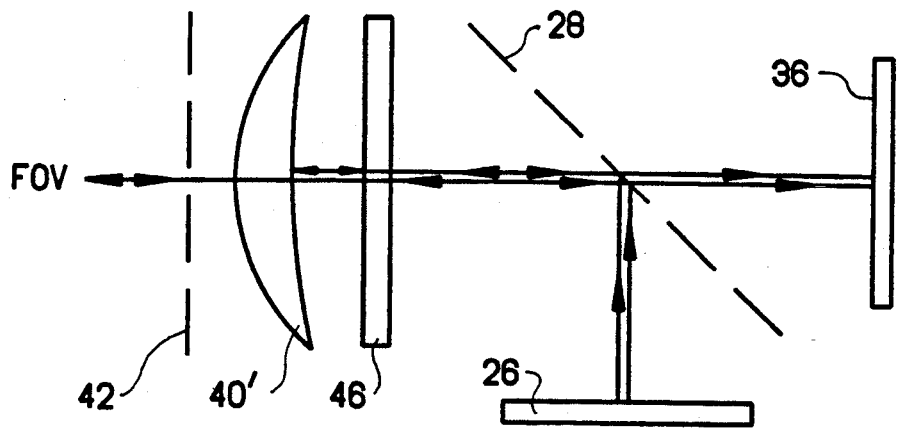
FIG. 12 shows an alternative embodiment of the optical arrangement of the system of the invention corresponding to FIG. 11.

FIG. 11 shows a possible optical arrangement of the millimeter wave signal detecting system discussed above in connection with FIG. 8. In this embodiment, the local oscillator is also a source of illuminating radiation. This device may thus be employed as a self-contained portable contraband detection device. Of course it may also be used together with supplemental illumination sources 162, 164. Incident radiation 12 reflected from an object in the field of view passes through lens 40, optional high-pass filter 42, an optional quarter-wave plate 46 (to be described) and polarizing grid 28, after which it is combined with a local oscillator signal emitted by a source 26 of millimeter wave energy. As discussed above, the linearly polarized radiation 34 emitted by the source 26 is divided by the polarizing grid 28 into major and minor portions 24 and 30 respectively. The major portion 24, desirably including about 90 percent of the millimeter wave energy, passes outwardly as indicated at 48 to illuminate the field of view with millimeter wave radiation. The remaining minor portion 30 of the radiation 34 emitted by the source 26 is incident on a twist reflector 50. This device, which is described in connection with FIG. 16, has the property of rotating the polarization of the linearly polarized incident energy by 90°. Accordingly, when the twist reflector 50 reflects the minor component 30 of the radiation back onto the polarizing grid 28, it is then reflected towards the mixer/detector array 36, and becomes a local oscillator signal 14 for combination with the portion of the illumination beam 24 having been reflected from the field of view. An alternative arrangement is shown in FIG. 12.

The system elements shown in FIGS. 9, 10, and 11 are generally referred to as quasioptical or as employing Gaussian optics. These terms refer to the fact that the wavelength of the radiation is comparable to the aperture of the array elements, such that diffraction effects are highly significant, and conventional straight-line ray tracing analytical techniques cannot be used. For example, lens 40 is generally as described in Goldsmith et al., "Gaussian Optics Lens Antennas", *Microwave Journal*, July 1984.

The polarizing grid 28 (and grid 43, if used) may comprise a series of parallel conductors spaced from one another by a dielectric medium. Such components are commercially available from the assignee of this application. In a particularly preferred embodiment, the conducting members may be spaced parallel wires, e.g., of tungsten coated with gold, spaced in air. A less expensive alternative is to photolithographically deposit flat conductive strips onto a dielectric substrate, e.g., Mylar (TM). In either case, the orientation of the conductors (which are indicated generally at 44 in FIGS. 10 and 11), with respect to the direction of polarization of the electric field of the millimeter wave energy 34 emitted by the source 26, determines the fraction of the incident millimeter wave energy which is reflected from the grid 28; the remainder 30 passes through the grid 28.

More particularly, in a preferred embodiment, the spacing of the conductors 44 is approximately equal to or less than the wavelength of the millimeter wave radiation emitted by the source 26 divided by five. This grid 28 transmits the component of the linearly polarized electric field which is perpendicular to the direction of the conductors and reflects the portion which is parallel to their direction. If the conductors 44 are angled with respect to the direction of polarization of the radiation, a corresponding fraction passes through, and the remainder is reflected.

The filter 42 is generally as described in Goldsmith, "Designing Quasioptical Systems", in *The Microwave System Designers Handbook*, Fifth Edition (1987), and may comprise a metal plate having an array of holes drilled therein to provide a high pass filter for the millimeter wave radiation of interest.

As indicated, a quarter-wave plate 46 may be interposed between the polarizing grid 28 and the lens 40, in the FIG. 11 embodiment of the detector. The quarter-wave plate 46 is a known component which converts a linearly polarized incident wave, such as that emitted by the source 26, into a circularly polarized wave. Such a circularly polarized wave may have more desirable reflection characteristics from an object to be imaged than the linearly polarized wave; for example, a linearly polarized wave can be reflected asymmetrically depending on the particular orientation of the object, whereas a circularly polarized wave has more uniform reflection characteristics. Upon reflection of the circularly-polarized wave from the object, the quarter-wave plate 46 will reconvert it to a linearly polarized wave, such that it will pass through the polarizing grid 28 without substantial attenuation. The quarter-wave plate 46 may be manufactured from crystalline sapphire or by machining appropriate grooves into a dielectric material such as Rexolite (TM).

In the FIGS. 9 and 10 embodiment of the detector, a similar quarter-wave plate may be placed behind the lens 40 and comparable devices placed between the source arrays and the field of view. The latter would convert the linearly polarized emitted radiation to circularly polarized radiation.

Figure 16:
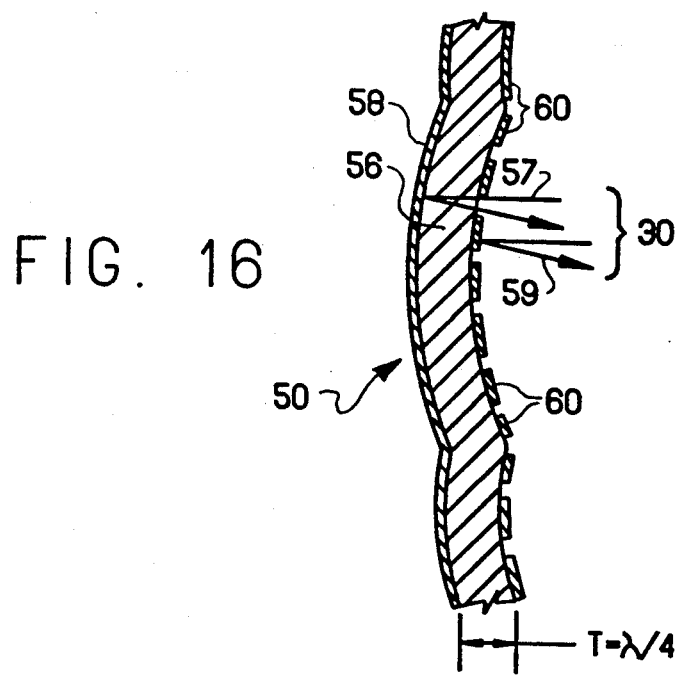
FIG. 16 shows a cross sectional view of a twist reflector which can be used in the embodiment of the invention described in connection with FIGS. 8 and 11.

The twist reflector 50, which is used only in the FIGS. 8 and 11 embodiment, is shown schematically in FIG. 11 and in more detail in FIG. 16. The twist reflector 50 comprises a number of generally concave or dish-shaped elements arranged in an array. Preferably, the number of elements in this array is equal to the number of elements in the array of millimeter wave emitters making up source 26. The shape of the concave elements of the array 50 is such as to focus the divergent beams emitted by the elements of the source 26 onto a corresponding area on the surface of the array 36 of mixer/detector elements after reflection from the polarizing grid 28.

As indicated in FIG. 16, the twist reflector 50 comprises a dielectric substrate 56 coated on its rear side with a conductive layer 58, and on its front surface with a series of strips 60 of conductive material oriented at 45° to the direction of polarization of the incident wave. The thickness of the dielectric 56 is one-quarter wavelength, such that the effective travel distance of the wave through the dielectric is one-half wavelength. Accordingly, when a component 57 of the incident wave 30 which is reflected from the rear conductive layer 58 is combined with a component 59 directly reflected from the strips 60, they will be 180° out of phase. This is equivalent to rotating the direction of polarization of the incident beam by 90°. Accordingly, the beam 30 incident on the twist reflector 50 (which, it will be recalled, had passed through grid 28) is effectively rotated by 90° with respect to the polarizing grid 28. When the rotated beam is again incident on grid 28, it is, therefore, reflected onto the array 36. Preferably, the concave elements of the twist reflector 50 are square and are fitted into a mosaic, in which as mentioned each element corresponds to one of the emitters of the source 26.

FIG. 12 shows an alternative optical arrangement of the detector of the system of the invention in the FIG. 8 and 11 embodiment in which the twist reflector 50 is eliminated. Again a transmitting array 26 located in the focal plane of the lens transmits linearly-polarized millimeter-wave energy onto a polarizing grid 28 which directs it towards a field of view (FOV). The transmitted energy travels through a quarter wave plate 46 which transforms it from a linearly polarized beam to a circularly polarized beam. The circularly polarized beam is then incident on lens 40' which in this case is a meniscus lens, that is, a concave-convex lens. The meniscus lens may be formed of materials such as Rexolite (TM) or Teflon (TM). See the Goldsmith and Goldsmith et al articles discussed above. A portion of the incident radiation is reflected from the lens 40' and becomes the local oscillator signal. As is well known to those of skill in the art, the precise amount of the radiation reflected can be controlled as needed by the employment of known anti-reflective coatings on the surface of lens 40'. The remainder of the energy incident on lens 40' is transmitted therethrough to become the illumination beam. The quarter-wave plate 46 transforms the circularly-polarized reflected local oscillator portion of the beam back into a linearly-polarized beam, but at a polarization of 90° to the original energy, so that it passes through the polarizing grid 28 and is incident on the mixer/detector array 36. A high pass filter may be employed as indicated at 42.

Accordingly, in this embodiment of the invention, the twist reflector 50 of FIGS. 2 is replaced by the meniscus lens 40', which has the property of passing a major portion of the energy to become the beam which illuminates the field of view while reflecting a minor portion of the energy to become the local oscillator signal which is then incident on array 36.

In this embodiment of the invention, the polarizing grid 28 need not be aligned with respect to the polarization of the energy from the source array 26 in order to divide the energy into local oscillator and illumination portions; this function is provided by the intrinsic characteristics of the meniscus lens 40', optionally in conjunction with an antireflective coating as discussed above. Both the local oscillator portion of the energy from the source and the energy reflected from objects in the field of view pass twice through the quarter-wave plate 46. This provides a 90° change in polarization direction, so that the energy passes through the polarizing grid 28 and is incident on the mixer/detector array 36. One advantage of this design is that depending on various parameters it may be somewhat simpler to fabricate the meniscus lens than the twist reflector.

Other optical arrangements are possible. For example, a Faraday rotator can be substituted for the quarter wave plate in the embodiment of FIG. 12. The Faraday rotator is described in the Goldsmith article, "Designing Quasioptical Systems", referred to above. The Faraday rotator provides 45° rotation of the polarization beam such that both the minor local oscillator portion of the emitted energy and the energy reflected from objects in the field of view are rotated through 90°. In this case, the illumination beam would be linearly polarized (rather than circularly polarized, as when the quarter-wave plate is used). This may be desirable, depending on the reflection characteristics of the objects to be imaged.

A further possibility would be to provide a Faraday rotator and mirror combination in place of the twist reflector described in connection with FIG. 11. Again this combination could reflect the local oscillator portion of the beam and rotating its polarization through 90°, such that on its second incidence on the polarizing grid 28, it would be reflected therefrom to become a local oscillator signal for mixing with the received signal from the field of view in the array of mixer/detector elements 36.

As previously described, detection of the orthogonal polarization reflected signal is advantageous for imaging certain types of contraband. In order to effect this in conjunction with the systems shown in FIGS. 11 and 12, other polarization elements can be employed. The quarter-wave plate 46 described in connection with FIG. 11 can be replaced by a half-wave plate, oriented such that it rotates the polarization of the illumination and reflected beams each by 90°. See the Goldsmith and Goldsmith et al articles described previously. An additional Faraday rotator effecting a 45° rotation can be disposed between the meniscus lens 40' and the (optional) high pass filter 42 in FIG. 12 to accomplish the same result.

As indicated above, according to an important aspect of the invention, quasi-coherent radiation (radiation which is linearly polarized in a single plane, but which is not frequency or phase coherent) from multiple element sources 162, 164 is transmitted into the field of view.

Figure 13:
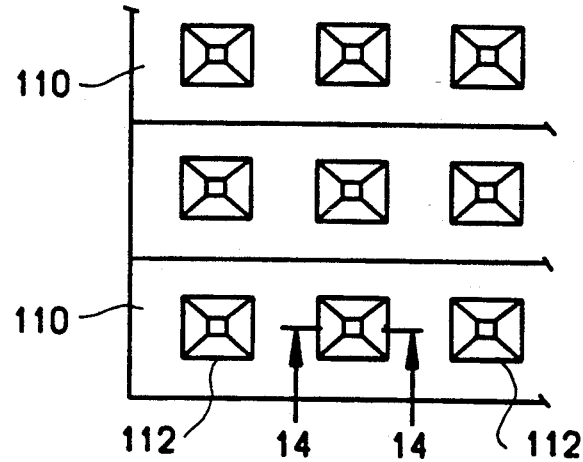
FIG. 13 shows a plan view of an array of a first embodiment of millimeter wave oscillators which can be used as a source of millimeter wave energy.

FIG. 13 is an end-on view of one embodiment of typical source oscillator arrays 26 which can be employed both as local oscillator sources (FIGS. 7, 8, 10 and 11) and as illumination sources 162, 164 (FIGS. 2 and 3). In this embodiment of the oscillator sources, waveguide oscillators are used. A second embodiment of the source array, in which millimeter-wave integrated circuits are employed, is discussed below in connection with FIG. 17.

In both cases, Gunn diode oscillators are shown; other solid state oscillators (e.g, IMPATTs) are of course also usable, as are klystrons, although the latter are currently less practical. The functional requirement is for a source of single frequency energy of appropriate frequency with linear polarization.

Figure 14:
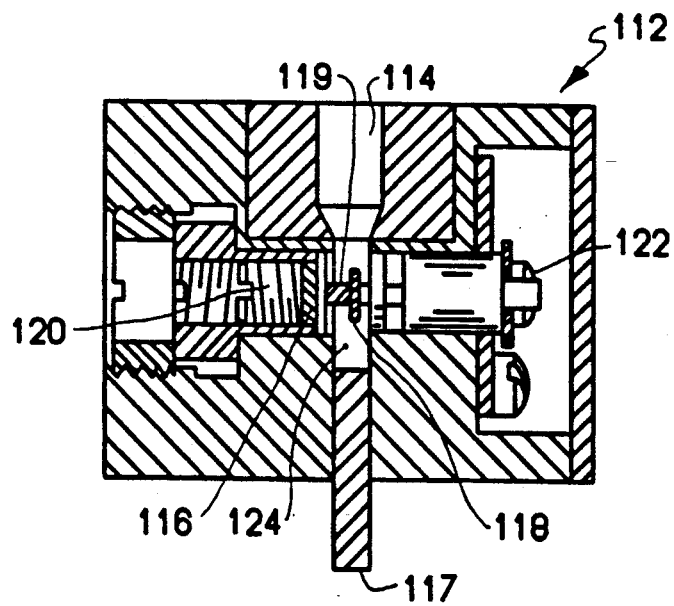
FIG. 14 shows a cross sectional view taken along the line 14—14 of FIG. 13.

The array of FIG. 13 comprises a number of identical elements 112. FIG. 14 is a cross section taken along line 14—14 of FIG. 13, and shows a detail of one of the elements 112 in the source array 26. Each element 112 comprises a linear oscillator cavity 114 including an integral radiator horn output section. The active element is a Gunn diode element 116, the construction of which is generally conventional. The cavity comprises a radial disc resonator 118 located along a coaxial RF choke structure 119 which supplies DC bias to the Gunn diode element 116. A fixed backshort 117 is used to optimize the performance of the basic oscillator. This type of element is referred to in the art as a "waveguide cavity resonator" which is driven by the Gunn diode.

As can be observed from FIG. 14, the diode element 116 is compressed by a threaded member 120 into the resonator structure 119. The center frequency of the Gunn diode oscillator is determined by the diameter of the resonator disc 118; minor adjustments to its frequency can be provided by mechanical tuning rod 124. The bias voltage of the InP Gunn diode can be varied in order to transmit millimeter wave energy at frequencies varying by approximately ±300 MHz at 95 GHz. If needed, additional tuning can be provided by introducing a dielectric material such as sapphire into the vicinity of the resonant disc 118. Typical continuous-wave radiative power levels for the device are 100 mw/emitter at 95 GHz. As noted, normal manufacturing tolerances on the components of these oscillators ensure that their resonant frequencies will vary sufficiently that an array of such sources will emit essentially incoherent radiation, as required according to one aspect of the invention. This is very convenient; by comparison, rather elaborate measures would be required if it were desired that the sources be coherent (i.e., all oscillate at the same frequency) as suggested by some of the prior art.

As discussed above, it is also possible to form the millimeter wave sources on the same substrate as the radiating antenna elements. Such microwave integrated circuit (MIC) devices, which are shown in FIGS. 17 and 18, may prove economically preferable to those shown in connection with FIGS. 13 and 14 in a number of applications.

An MIC millimeter wave oscillator (FIG. 17) typically utilizes a discrete-package Gunn diode device mounted on a conductive base plate which supports a dielectric substrate on which the printed circuit components of the oscillator are formed. See generally, Rubin, "Varactor-Tuned Millimeter-Wave MIC Oscillator", *IEEE Trans. on Microwave Theory and Techniques*, 866–867 (Nov. 1976).

There are three essential planar components of each MIC oscillator:

(1) A resonator, to establish the operating frequency;
(2) A bias network, to provide DC voltage to the diode, without interfering with the oscillator operation; and
(3) An output network to extract the power from the Gunn diode and match the impedance of the load circuit.

FIG. 17 shows a number of different resonant circuit geometries in configurations which may be appropriate in various circumstances. Typically a planar resonator is formed which comprises a conductive member having a dimension equal to one-half or one full wavelength at the intended operating frequency of the device. The resonator in conjunction with the Gunn diode establishes the operating mode and operating frequency of the oscillator. Variations in these devices according to manufacturing tolerances, etc., from one oscillator to the next, provide sufficient variation in their resonant frequency to ensure that the illumination provided by them is non-coherent, as required according to one aspect of the invention. Again, this is obviously very convenient; the oscillators can simply be permitted to radiate at their resonant frequencies.

The bias network typically comprises a low pass filter of alternating high and low impedance transformer sections, each being approximately one-quarter wavelength long. The output network consists of a power coupling arrangement for coupling a "microstrip" transmission line to a suitable antenna. Where the antenna is also planar, for example when a transmitting antenna similar to the receiving antenna discussed above in connection with FIGS. 4 and 5 is used, no coupling structure per se is needed, and the antenna elements can be formed directly on the same substrate as the oscillator itself.

Figure 17A:
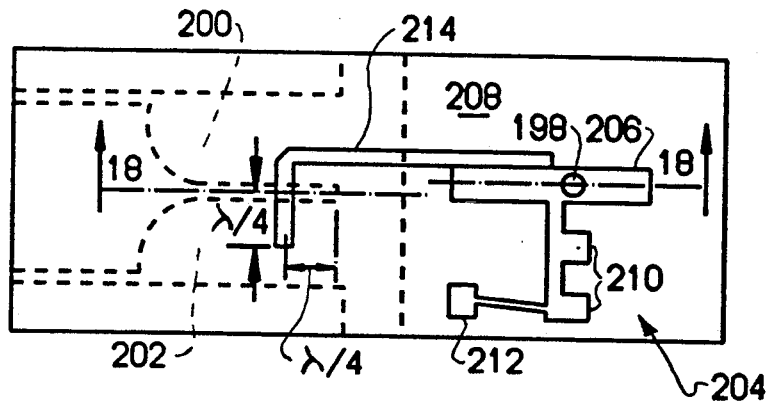
FIGS. 17(a)-(e), shows integrated circuit embodiments of millimeter wave sources which can be employed in connection with the invention.
Figure 17B:
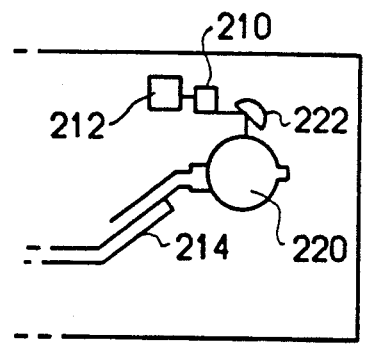
Figure 17C:
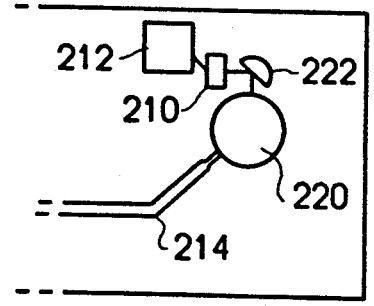
Figure 18:
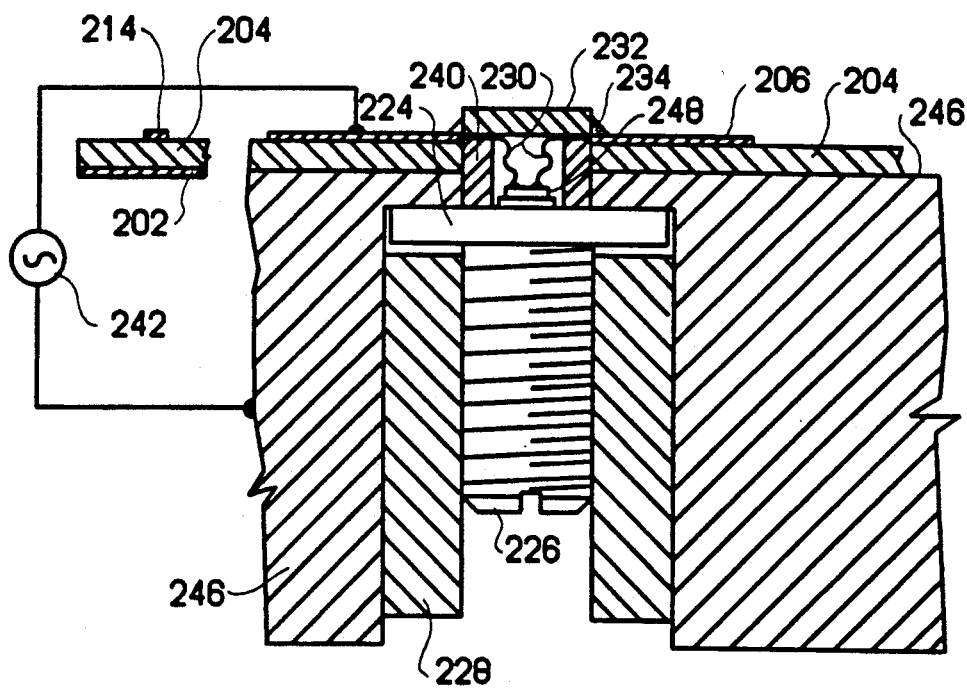
FIG. 18 shows a cross-sectional view along the line 18—18 of FIG. 17.

FIG. 17(a) shows such an assembly. The antenna elements 200 and 202 of the oscillator are essentially similar to those discussed above in connection with FIGS. 4 and 5. Large numbers of these assemblies can be formed on a single substrate, and plural substrates mounted on a panel to form a multiple-element source of linearly-polarized millimeter-wave local oscillator and/or illumination energy.

The oscillator section 204 comprises a conductive resonator 206 formed on a dielectric substrate 208. A Gunn diode 198 is assembled to the resonator 206 in a manner discussed below in connection with FIG. 18, which is a cross-section taken along the line 18—18 of FIG. 17(a). The bias network comprises enlarged conductive areas 210 connected to the resonator 206; these comprise an RF filter choke which prevents the microwave energy from propagating toward the positive bias voltage connection, which is indicated at 212. Negative bias is provided to the conductive block on which the circuit is formed, as indicated in FIG. 18. Amplitude modulation of the output millimeter-wave energy is accomplished simply by modulation of the bias voltage.

An output structure comprising a conductor indicated at 214 couples the oscillator to the paired conductive elements 200 and 202 of the antenna. The conductor 214 extends over the ends of the conductive elements 200 and 202, and is spaced from them by the dielectric substrate 204 (see FIG. 18). The end of the conductor 214 extends past the slot between the conductive elements 200 and 202 a distance equal to the operating wavelength of the system divided by four, and the end of the slot extends a similar distance past the conductor 214, as indicated.

Figure 17D:
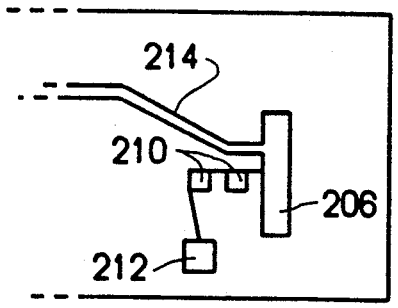
Figure 17E:
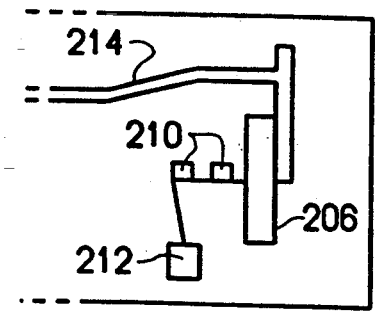

FIGS. 17(b)-(e) show alternative embodiments of the oscillator structure. Those shown in FIGS. 17(b) and (c) include circular resonators 220, and semicircular RF choke elements 222; the operation of these devices is essentially similar to that of FIG. 17(a). The principal resonant mode of the circular oscillator is circular, while the rectangular resonator 206 shown in FIG. 17(a) has a linear principal oscillation mode. The circular oscillator 220 is coupled to the antenna elements similarly to that of FIG. 17(a), as indicated by the dotted lines. FIGS. 17(d) and (e) show alternative arrangements of a millimeter-wave source having a rectangular resonator, as shown in FIG. 17(a). The selection between these alternative constructions can be made in accordance with well-understood engineering principles and according to the desired layout of the device on the circuit substrate.

The millimeter-wave oscillators shown in FIGS. 17(a)-(e) may also be employed to drive a waveguide-type transmitting antenna, if desired. In such case, the end of the network output lead 214 can be simply extended endwise through a slot in one wall of a rectangular waveguide, that is, into its interior cavity. The plane of the planar network output lead 214 lies along the axis of the waveguide, and parallel to two of its walls.

FIG. 18 shows, as mentioned, a cross-sectional view along the line 18—18 of FIG. 17(a), that is, through the actual diode structure itself. The conductive resonator 206 is disposed on the dielectric substrate 204 which in turn is disposed upon a heavy brass block 246. A standard Gunn diode package, comprising a diode chip 248 on a conductive pedestal 224 formed integrally with a threaded conductive heat sink member 226, is threaded into the block 246 by way of intermediate bushing member 228. The objective of this structure is to provide a high heat sinking capacity to the chip 248. The chip 248 is connected by plural bonding wires 230 to a diode cap 232 which is soldered as indicated at 234 to the resonator 206. Plural leads 230 are provided to reduce the impedance of the connection between the diode cap 232 and the chip 248. The spacing of the cap 232 from the ground plane established by the block 246 is defined by the threaded heat sink 226, and is important to reduce the shunt capacitance of the structure. An alumina spacer ring 240 separates the diode cap 232 from the threaded heat sink member 226 by the proper amount.

Bias voltage is supplied as indicated at 242 to drive the diode and cause it to oscillate at its resonant frequency. The bias voltage can be modulated to provide modulated output millimeter wave energy, as mentioned above. In general, each of the elements of the sources will be modulated identically.

As indicated above, there are engineering tradeoffs to be made in the selection of a millimeter wave energy source, and in particular, between the integrated circuits shown in connection with FIGS. 17 and 18 and the waveguides shown in connection with FIGS. 13 and 14. Hybrid structures using the FIG. 17 oscillator with waveguide rather than planar antennas are also feasible. At present, conventional waveguide Gunn diode oscillators as shown in FIGS. 13 and 14 are more expensive but provide higher output levels than the integrated circuit devices currently available. The applicants believe, however, that ultimately the integrated circuit devices described in connection with FIGS. 17 and 18 will be sufficiently powerful to be used in most of the applications for the present invention discussed in this specification. Furthermore, the production cost of the planar integrated circuit devices is sufficiently low, compared to the three dimensional waveguide devices of FIGS. 13 and 14, that the integrated circuit devices can economically be multiplied to yield any desired output power level. Savings in space and weight are also expected to be realized by employment of the planar construction shown in FIGS. 17 and 18. As mentioned, other sources of radiation are within the scope of the invention where functionally equivalent. Specifically, the individual sources of millimeter wave energy employed according to the preferred embodiment of the invention provide linearly polarized energy; the energy provided by any such source is normally at substantially a single frequency.

Selection of an operating wavelength and frequency for the system according to the invention involves several design tradeoffs. Aperture size is reduced for smaller wavelengths, encouraging miniaturization of antenna components, but mixer performance decreases at the higher frequencies concomitant with smaller wavelengths. At present, the optimum frequency is considered to be 94 GHz (3 mm wavelength) or 140 GHz (2 mm), but this could change as better components (principally mixers and sources) become available or are invented.

Figure 15:
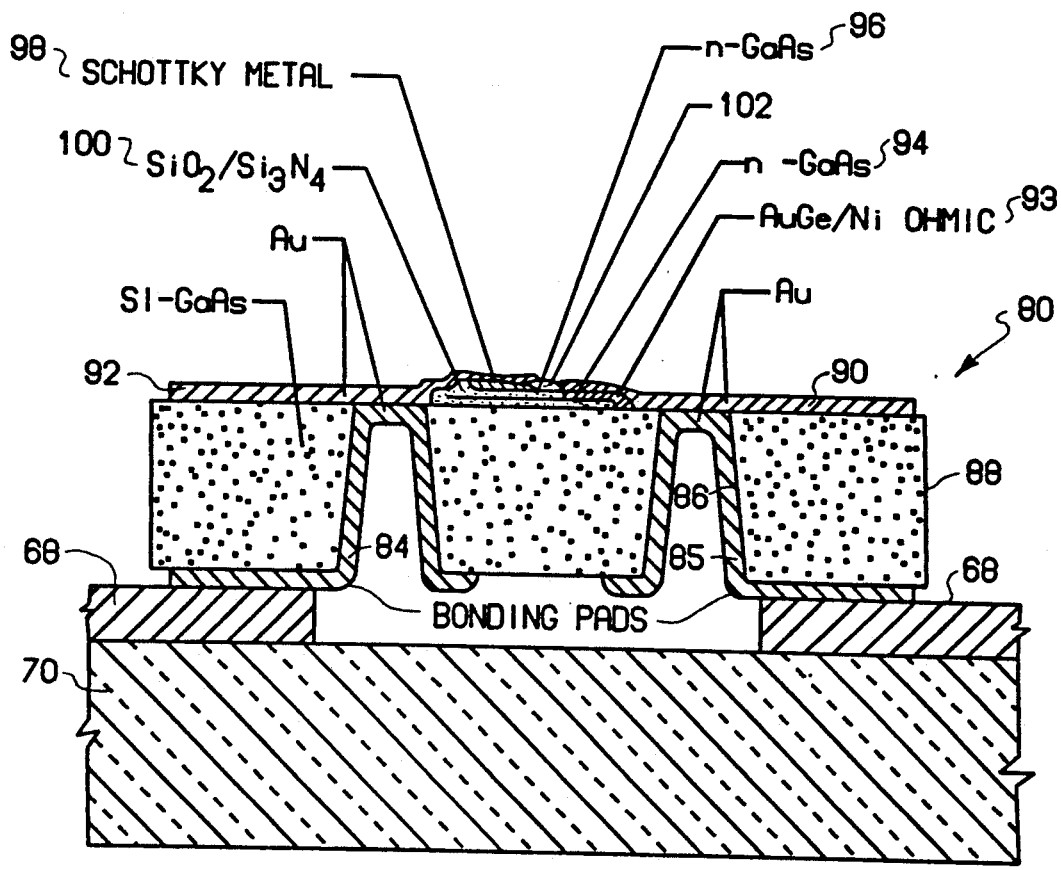
FIG. 15 shows a cross sectional view through a Schottky barrier diode which can be employed in each element of the imaging array of the invention.

FIG. 15 shows a cross-sectional view through one of the mixer diodes 80 which are preferably formed directly on the substrate 70 on which are formed the conductors 68 making up each of the antenna elements 66. In this embodiment, the diode 80 comprises bonding pads 84 and 85 which may be formed of gold and extend through vias (that is, through-holes) 86 in a semi-insulating (SI) GaAs substrate 88. The gold bonding pads 84 and 85 contact further additional gold electrodes 90 and 92 formed on the opposite side of the substrate 88. Electrodes 90 and 92 overlay the actual diode structure. The diode structure comprises a first layer 94 of $n^+$-GaAs which is in contact with the semi-insulating GaAs substrate 88. Over this is formed an n-GaAs layer 96. Atop this layer 96 is provided a layer 98 of Schottky metal, which in a preferred embodiment may be Ti/Pt/Au. The Schottky metal layer 98 is directly in contact with electrode 92 and is thus in contact with bonding pad 84. The $n^+$-GaAs layer 94 is in contact with the other electrode 90 and thus the other bonding pad 85 via an ohmic layer 93 of AuGe/Ni. Finally, an insulating/passivating $SiO_2/Si_3N_4$ material fills spaces 100 and 102 between the various layers. In a particularly preferred embodiment, the spaces 100 and 102 may also include an air gap between the electrode 92 and the GaAs layers 93 and 94, i.e., around the Schottky metal 98, with or without the $SiO_2/Si_3N_4$ material. This has the beneficial effect of reducing the parasitic capacitance of the mixer diode 80.

It will be appreciated that the structure described lends itself to ready fabrication directly on the substrate 70 carrying conductors 68 of the mixer/detector assembly, particularly as compared with a process involving assembly of conventional discrete diode elements, e.g., vertically-oriented or planar beam-lead diodes to the electrodes.

Ultimately, and subject to further developments in semiconductor materials and fabrication techniques, it may be possible to integrate the function of amplifiers 82 with that of mixer/detector diodes 80. This would require the development of amplifiers capable of operation at millimeter-wave frequencies. It is envisioned that such devices could perform the mixing and amplification functions within a single semiconductive element. This would be highly desirable, as it would presumably substantially increase the signal-to-noise ratio of each mixer/detector element 66. The claims of this application are intended to include such improved devices, when they become available.

The components of the contraband detection system of the invention having been disclosed in detail, certain of its aspects and the improvements it provides can now be better understood. It will be appreciated that there has been described a millimeter wave contraband detection device which comprises a "staring" array of mixer/detector elements which does not require mechanical or electronic scanning in order to provide an image of an entire field of view. Instead, at all times, the output signal from each of the antenna/detector elements of the array 36 is mapped uniquely to a portion of the device's field of view. For this reason, according to an important aspect of the present invention, it is not necessary that a detecting device be mechanically scanned with respect to the field of view, or that the sources be scanned, in order that a complete image can be generated, as in all proposed prior contraband detection systems employing millimeter waves. Instead, the detectors each respond to millimeter wave energy from a portion of the field of view. This greatly simplifies generation of an image of objects in the field of view, and allows doing so essentially in real time.

Similarly, according to the invention, the entire field of view can simply be illuminated uniformly by a number of spatially distributed quasi-coherent sources, each formed of a plurality of individually coherent sources. The spatial distribution eliminates "glint", while the avoidance of coherent illumination eliminates "speckle". The oscillators are permitted to radiate at their respective resonant frequencies; manufacturing variations will be sufficient to ensure that coherency is avoided in a single, elegant, and cost free manner.

The millimeter wave sources and detectors of the invention which can be used for interdiction of drug trafficking or for detection of plastic or ceramic weapons not readily detectable or discernable by x-ray or magnetic detectors, rely in part on the fact that the polarization of electromagnetic waves is randomly rotated to a degree by amorphous dielectric materials. According to the invention, the system operating parameters are optimized in accordance with the material to be detected, and the background return signal to be avoided. As discussed above, the ceramic and plastic materials now finding increasing use in weapons are best detected according to applicants, invention if the plane of polarization of the radiation emitted by the sources is orthogonal to the polarization of radiation to which the detector arrays are preferentially sensitive.

According to another aspect of the invention, as discussed above, the polarization of the illumination relative to that of the detectors can be varied. For example, one or the other can be effectively rotated or varied over time for detection of metallic weapons (where the planes of polarization should be parallel) and for detection of plastic or ceramic weapons (where the planes of polarization should be orthogonal).

Conventional target detection systems involving detection of reflected radiation, e.g. radar systems, rely principally on retroreflection, in which radiation is reflected from the target back directly at the source. For this reason, radar reflectors comprise "inside corners" from which a direct reflection can usually be detected; for the same reason, the so-called Stealth aircraft design avoids sharp corners between flat surfaces. Retroreflection commonly involves a number of reflections from flat, uniformly reflective surfaces. The electric field vector of the reflected radiation experiences a 180° phase change upon each such reflection, which is equivalent to a 180° rotation of the plane of polarization. Therefore, in order to optimize detection, the plane of preferential sensitivity of the detector is conventionally aligned parallel to the plane of polarization of the illumination radiation.

According to the present invention optimal detection of plastic, ceramic and other amorphous dielectric objects (such as bags of narcotic powder) is obtained when the plane of preferential sensitivity of the detector array is orthogonal to the plane of polarization of the incident radiation. (As above this is referred to herein as the "orthogonal arrangement" of the system of the invention.) This arrangement is therefore contrary to the accepted practice for detecting radar targets. Applicants believe that the orthogonal arrangement is effective because amorphous materials reflect the polarized radiation more or less randomly, such that a detectable fraction of it lies in the plane of preferential sensitivity of the detector, which according to the orthogonal arrangement then is able to provide adequate contrast in the received signal.

Furthermore, by use of the orthogonal arrangement, detection of reflection from specular metallic surfaces is reduced for the reasons noted above, that is, the detectors are arranged to reduce their sensitivity to radiation from specular metallic objects. This further increases the effective signal-to-noise ratio for radiation reflected from the amorphous ceramic and plastic objects.

Finally, it appears that reflection of radiation from flesh and clothing does not alter its polarization appreciably, so that it does not contribute significant noise to the signal detected in the orthogonal arrangement of the system.

As noted, metallic weapons and other objects can still be detected using the system of the invention in the orthogonal arrangement, because they normally comprise surfaces which are not flat (e.g., trigger guards, grips, and the lines along which the external planes of their barrels meet). Random reflections or "scattering" from these surfaces can be detected by the system in its orthogonal arrangement. Such objects show up as points of reflectivity on a video imaging system, and are readily identifiable by operators.

More specifically, according to one aspect of the invention, polarized radiation is used according to the invention to illuminate the objects to be examined because the "reflection history" of polarized radiation can be determined upon detection of the reflected radiation. In the linear-polarization case, as discussed above, the plane of polarization of the radiation remains unchanged upon reflection from specular metallic surfaces, but is varied randomly upon reflection from and scattering within amorphous objects. Specifically, the polarized radiation undergoes varying multiple internal reflections, as well as scattering from external features, leading to random superposition of changes in the plane of polarization, upon reflection from such amorphous objects. The linearly polarized radiation reflected from metallic objects can be removed from the detected signal by disposing the detectors orthogonal to the plane of polarization of the radiated reflection. A polarizing grid can be employed to further filter out the unwanted signal component. The signal which remains to be detected is therefore principally radiation reflected from the amorphous objects.

In the Hodges et al report discussed above, it was noted that certain plastic explosive materials ("plastique") could not be detected using the system there described. These materials can be detected using the system of the invention because during manufacture the material is stressed, so as to leave stress lines which serve as internal scattering centers. Objects made of these materials thus show stress lines when imaged using the system of the invention. [It will be appreciated that plastic models of structures are commonly built and photographed under polarized light to analyze the stress patterns. The polarized radiation is scattered from the internal structure of the plastic in a manner which varies according to the stress on the object. A similar scattering mechanism is used according to this aspect of the invention.] This is a somewhat different scattering mechanism than that responsible for detection of materials such as bags of powder. Molded objects such as ceramic or plastic handguns may exhibit both scattering mechanisms.

The same property of preserving the reflection history may be useful in embodiments of the invention employing radiation exhibiting other polarization characteristics, by discriminating radiation reflected from metallic surfaces (again, which involves a predictable phase change of the electric field) from radiation randomly affected upon reflection from amorphous objects.

It was mentioned above that the linearly polarized radiation used in the preferred embodiment of the invention is a special case of the more general elliptically polarized radiation. Elliptically polarized radiation could also be used for contraband detection according to the invention, as could circularly polarized radiation, another special case. For example, linearly polarized transmitted radiation can be converted to circularly-polarized form using a quarter-wave plate, as discussed in connection with FIG. 11. The "handedness" of the radiation changes uniformly upon reflection from metallic surfaces, while the circularly polarized radiation can be expected to be reflected more randomly from amorphous objects. The circularly-polarized radiation received at the detector can similarly be converted to linearly-polarized radiation by a second quarter wave plate. The polarization of this radiation will correspond to the "handedness" of the received circularly polarized radiation; the orientation of the detector array can then be employed to detect the handedness of the detected radiation. However, radiation reflected by metallic and amorphous objects will normally both contain radiation of both handednesses. For this reason, orthogonal orientation of the sources and detectors may not be sufficient of itself to discriminate between the reflecting objects as in the case of linearly polarized radiation, which is used in the preferred embodiment of the invention. However, in certain circumstances, elliptically or circularly polarized radiation may be highly useful for contraband detection using the system of the invention.

As an alternative to using quarter-wave plates to transform linearly polarized radiation to circularly polarized radiation at the source and to perform the inverse transformation at the detector, sources and detectors of circularly-polarized radiation may be employed. These could comprise spiral conductors formed on substrates perpendicular to the optical axis of the system. Diode oscillators and mixers would be located at the center of the respective spirals to perform the same functions discussed above. Ground planes on the rear of the substrates would provide the other terminals of the transmitting and receiving antennas. Through-holes in the substrates would carry power to the transmitting antenna and the signal from the detector diode. The handedness of the transmitting antenna's spiral determines the handedness of the transmitted radiation, and the detection antenna will preferentially detect radiation of the opposite handedness, i.e., of the orthogonal polarization, aligned in the opposite orientation. Alternatively, special feed arrangements to square or rectangular patch antennas disposed on a planar substrate perpendicular to the optical axis of the system can be used to generate or receive circular polarization.

As mentioned, it will be recognized that both linear and circular polarization are special cases of elliptical polarization. Linear polarization is preferred based on practical component availability considerations, and because linear polarization affords, as discussed, a ready and elegant means of eliminating noise due to radiation reflected from clutter, i.e. objects other than contraband, thus improving the signal-to-noise ratio of the signal of interest. Nevertheless, the claims of this application are to be deemed to include radiation polarized other than linearly, unless they are specifically limited thereto.

The system of the invention has principally been discussed in connection with a portal inspection system for control of the access of individuals to secured areas. Other uses for and configurations of the system of the invention will be apparent. For example, the presence of a quantity of marijuana in a bulk dielectric material, such as a bale of some other vegetation, could be detected by placing a millimeter wave source on one side of the bale and a detector on the other. Unless the dielectric constant of the marijuana were somehow made precisely equal to that of the vegetation, a detectable variation in transmission strength would occur, indicating that the material was not homogeneous. An imaging device could be arranged to display the relative position of the material within a larger quantity of vegetation. In the same manner, large quantities of dielectric materials could be inspected for the presence of weapons, contraband, and the like. Such a system, used in either the transmissive or reflective mode, could be used to inspect the holds of grain-carrying ships and the like. Sources and detectors according to the invention could be provided on either side of airline conveyors carrying passenger baggage for its inspection.

Any of a wide variety of image processing and image enhancement and analysis techniques may be combined with the signal generation and processing techniques according to the invention, such as convolution, false coloration, edge enhancement, contrast enhancement, and identification of individual objects in the image both by comparison to known shapes and otherwise. Note in this connection that the fact that the image signal is provided pixel-by-pixel by the staring array of the invention makes it particularly amenable to many image processing techniques, especially those involving Fourier transformation. Such teachings, which are now or later fall within the skill of the art, are considered to be within the scope of the invention unless expressly excluded by the following claims.

While several preferred embodiments of millimeter wave components provided by the invention have been described above, together with several applications for their use, these should not be considered to limit the invention. The invention is to be limited only by the following claims.

We claim:

1. Apparatus for detection of contraband, comprising:
   at least one two-dimensional array of spatially distributed point sources of millimeter wave radiation arranged to illuminate a field of view,
   wherein the radiation emitted by the point sources is amplitude modulated;
   means for focusing millimeter wave radiation from the field of view onto a focal plane; and
   a two-dimensional staring array of detectors disposed in said focal plane, each of the detectors generating an output signal responsive to millimeter-wave radiation from a particular portion of the field of view,
   wherein said output signals of said detectors provide sufficient information for generating, essentially in real time, an image of the field of view such that the pixels of the image correspond to the output signals generated by the detectors of the array.

2. The apparatus of claim 1 wherein the point sources of radiation comprise oscillators which do not resonate at the same frequency thereby providing a substantially incoherent illumination of the field of view.

3. The apparatus of claim 1 wherein the radiation emitted by the point sources is amplitude modulated by a square wave.

4. The apparatus of claim 1 further comprising local oscillator means for providing a local oscillator signal to the array of detectors, whereby the detectors individually mix the local oscillator signal with the radiation received from the corresponding portion of the field of view.

5. The apparatus of claim 4 wherein the point sources provide the local oscillator signal as well as the signal for illuminating the field of view.

6. The apparatus of claim 5 further comprising means for splitting the energy output of each of the point sources into unequal parts, a minor part, which is used as the local oscillator signal, and a major part which is used for illuminating the field of view.

7. The apparatus of claim 1 wherein the radiation emitted by the point sources of radiation is linearly polarized in a first plane and the detectors of the array are preferentially sensitive to radiation linearly polarized in a second plane.

8. The apparatus of claim 7 wherein the first plane is orthogonal to the second plane.

9. The apparatus of claim 7 wherein the first plane is parallel to the second plane.

10. The apparatus of claim 7 further comprising means for varying the relative orientation of the first and second planes responsive to the nature of the contraband and to be detected.

11. A method of detecting contraband, comprising the steps of:
    uniformly illuminating a field of view, within which are disposed objects or persons to be examined, with millimeter-wave radiation generated by sources of such radiation;
    modulating the amplitude of the radiation emitted by the sources;
    disposing a two-dimensional array of detectors sensitive to millimeter-wave radiation in a position such that radiation reflected from objects or persons in the field of view is incident thereon, each of said detectors providing an output signal responsive to said radiation reflected from objects or persons in a corresponding portion of the field of view; and
    forming an essentially real time image of the objects or persons within said field of view, responsive to illumination radiation reflected therefrom detected by the elements of the array,
    wherein the pixels of the image represent the radiation detected by the elements from the corresponding portions of the field of view.

12. The method of claim 11 wherein the array of sources provides a substantially incoherent illumination of the filed of the view.

13. The method of claim 11 further comprising the step of providing a local oscillator signal to the array of detectors, which detectors individually mix the local oscillator signal with the radiation received from the corresponding portion of the field of view.

14. The method of claim 13 further comprising the step of dividing the energy output of each of the sources into unequal parts, a minor part, which is used as the local oscillator signal and a major part which is used for illuminating the field of view.

15. The apparatus of claim 11 wherein the radiation emitted by the sources of radiation is linearly polarized in a first plane and the detectors of the array are preferentially sensitive to radiation linearly polarized in a second plane.

16. The method of claim 15 wherein the first plane is orthogonal to the second plane.

17. The method of claim 15 wherein the first plane is parallel to the second plane.

18. The method of claim 15 further comprising the step of varying the relative orientation of the first and second planes responsive to the nature of the contraband to be detected.

19. Apparatus for detection of contraband, comprising:
    at least one two-dimensional array of spatially distributed point sources of millimeter wave radiation arranged to illuminate a field of view;
    means for focusing millimeter wave radiation from the field of view onto a focal plane;
    a two-dimensional staring array of detectors disposed in said focal plane, each of the detectors generating an output signal responsive to millimeter-wave radiation from a particular portion of the field of view, wherein said output signals of said detectors provide sufficient information for generating, essentially in real time, an image of the field of view such that the pixels of the image correspond to the output signals generated by the detectors of the array; and local oscillator means for providing a local oscillator signal to the array of detectors, whereby the detectors individually mix the local oscillator signal with the radiation received from the corresponding portion of the field of view.

20. The apparatus of claim 19 wherein the point sources provide the local oscillator signal as well as the signal for illuminating the field of view.

21. The apparatus of claim 20 further comprising means for splitting the energy output of each of the point sources into unequal parts, a minor part, which is used as the local oscillator signal, and a major part which is used for illuminating the field of view.

22. The apparatus of claim 19 wherein the point sources of radiation comprise oscillators which do not resonate at the same frequency thereby providing a substantially incoherent illumination of the field of view.

23. Apparatus for detection of contraband, comprising:

at least one two-dimensional array of spatially distributed point sources of millimeter wave radiation arranged to illuminate a filed of view, wherein the point sources of radiation comprise oscillators which do not resonate at the same frequency thereby providing a substantially incoherent illumination of the field of view;

means for focusing millimeter wave radiation from the field of view onto a focal plane; and a two-dimensional staring array of detectors disposed in said focal plane, each of the detectors generating an output signal responsive to millimeter-wave radiation from a particular portion of the field of view, wherein said output signals of said detectors provide sufficient information for generating, essentially in real time, an image of the field of view such that the pixels of the image correspond to the output signals generated by the detectors of the array.

24. The apparatus of claim 23 wherein the radiation emitted by the point sources of radiation is linearly polarized in a first plane and the detectors of the array are preferentially sensitive to radiation linearly polarized in a second plane.

25. The apparatus of claim 24 wherein the first plane is orthogonal to the second plane.

26. The apparatus of claim 24 wherein the first plane is parallel to the second plane.

27. The apparatus of claim 24 further comprising means for varying the relative orientation of the first and second planes responsive to the nature of the contraband and to be detected.

28. A method of detecting contraband, comprising the steps of:

uniformly illuminating a field of view, within which are disposed objects or persons to be examined, with millimeter-wave radiation generated by a two-dimensional array of sources;

disposing a two-dimensional array of detectors sensitive to millimeter-wave radiation in a position such that radiation reflected from objects or persons in the field of view is incident thereon, each of said detectors providing an output signal responsive to said radiation reflected from objects or persons in a corresponding portion of the field of view;

providing a local oscillator signal to the array of detectors, which detectors individually mix the local oscillator signal with the radiation received from the corresponding portion of the field of view; and forming an essentially real time image of the objects or persons within said field of view, responsive to illumination radiation reflected therefrom detected by the elements of the array, wherein the pixels of the image represent the radiation detected by the elements from the corresponding portions of the field of view.

29. The method of claim 28 wherein the array of sources provides a substantially incoherent illumination of the filed of the view.

30. The method of claim 28 further comprising the step of dividing the energy output of each of the sources into unequal parts, a minor part, which is used as the local oscillator signal and a major part which is used for illuminating the field of view.

31. The apparatus of claim 28 wherein the radiation emitted by sources of radiation is linearly polarized in a first plane and the detectors of the array are preferentially sensitive to radiation linearly polarized in a second plane.

32. The method of claim 31 wherein the first plane is orthogonal to the second plane.

33. The method of claim 32 wherein the first plane is parallel to the second plane.

34. The method of claim 33 further comprising the step of varying the relative orientation of the first and second planes responsive to the nature of the contraband to be detected.

* * * * *